United States Patent
Yamamoto et al.

[11] Patent Number: 5,805,537
[45] Date of Patent: Sep. 8, 1998

[54] INFORMATION RECORD MEDIUM, APPARATUS FOR RECORDING THE SAME AND APPARATUS FOR REPRODUCING THE SAME

[75] Inventors: Kaoru Yamamoto, Tsurugashima; Tokihiro Takahashi, Tokorozawa; Hidehiro Ishii, Tokorozawa; Hiroshi Nakamura, Tokorozawa; Tadashi Noguchi, Tokorozawa; Takao Sawabe, Tokyo-to; Junichi Yoshio, Tokorozawa, all of Japan

[73] Assignee: Pioneer Electronic Corporation, Tokyo, Japan

[21] Appl. No.: 819,861

[22] Filed: Mar. 17, 1997

[30] Foreign Application Priority Data

Mar. 18, 1996 [JP] Japan ..................... 8-061473

[51] Int. Cl.⁶ ................. G11B 7/00; G06F 7/24
[52] U.S. Cl. ................. 369/32; 369/4; 369/49; 369/84; 369/275.3
[58] Field of Search ................. 369/4, 47, 49, 369/48, 32, 84, 83, 275.3; 345/146; 386/106, 111, 125, 126

[56] References Cited

U.S. PATENT DOCUMENTS 5,636,186  6/1997  Yamamoto et al. .............. 369/49
5,701,385  12/1997  Katsuyama et al. .............. 386/106

*Primary Examiner*—Tod R. Swann
*Assistant Examiner*—Kim-Kwok Chu
*Attorney, Agent, or Firm*—Morgan, Lewis & Bockius LLP

[57] ABSTRACT

An information recording apparatus (SS1) is provided with: a signal process device (72, 72A, 72B) for applying a predetermined signal process to record information to be recorded onto an information record medium (1: DVD) to thereby generate processed record information (Srv, Sra) comprising a plurality of information units (AAU, AF), which are set in advance; a divide device (72, 72C, 72D) for dividing the processed record information by each record unit (APT), which includes one or more information units and which is set in advance on the basis of the predetermined signal process; a multiplex device (72, 72E, 72F) for setting a start position of one or more information units within each record unit, on the basis of control information (Si) inputted from the external (ST, 71) to control a reproduction of the record information, generating start position information (200) indicating the start position and multiplexing the start position information with the processed record information for each record unit, to thereby generate multiplexed processed record information (Sr); and a record device (77, 78) for recording the multiplexed processed record information onto the information record medium.

9 Claims, 14 Drawing Sheets

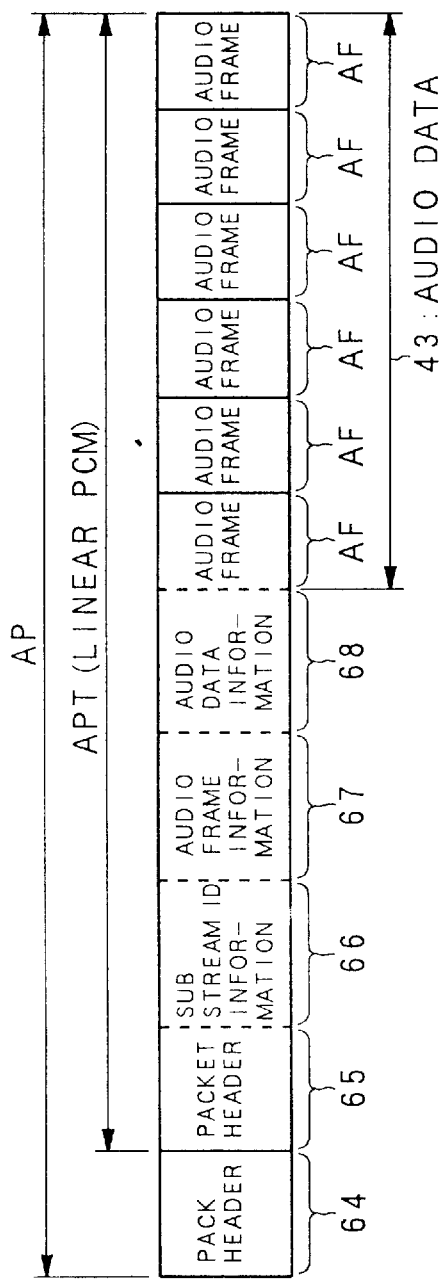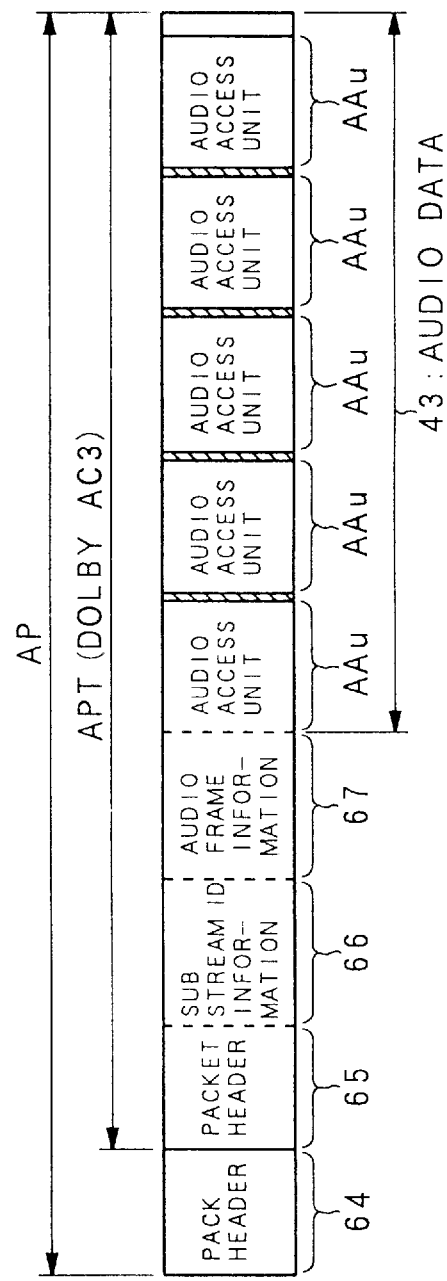
FIG. 3A
FIG. 3B

STRUCTURE OF INTERLEAVED UNIT

IU : INTERLEAVED UNIT

STRUCTURE OF AUDIO FRAME INFORMATION

INFORMATION RECORD MEDIUM, APPARATUS FOR RECORDING THE SAME AND APPARATUS FOR REPRODUCING THE SAME

BACKGROUND OF THE INVENTION

1. Field of the Invention

The present invention relates to an information record medium such as an optical disk of a high recording density type, which is capable of recording information such as video information, audio information and the like at a high density, and which is represented by a DVD (Digital Video or Versatile Disk). The present invention also relates to a recording apparatus for recording the information onto the information record medium, and a reproducing apparatus for reproducing the information from the information record medium.

2. Description of the Related Art

Conventionally, a so-called LD (Laser Disk) and a so-called CD (Compact Disk) are generalized as optical disks, on which information such as video information, audio information and the like is recorded.

On the LD or the like, the video information and the audio information are recorded together with time information indicating a time at which each information is to be reproduced with respect to a reproduction start position, which each LD or the like has, as a standard position. Thus, other than a general normal reproduction to reproduce the recorded information in the order of recording, various special reproductions are possible, such as a reproduction to extract and listen to an only desirable music out of a plurality of recorded musics, a reproduction to listen to the recorded musics in a random order and so on, in case of the CD, for example.

However, there is a problem that, according to the above mentioned LD or the like, a so-called interactive and variegated reproduction is not possible in which the audience can have a plurality of selection branches as for the video or audio information to be displayed or sound-outputted and in which the audience can select them to watch or listen to it.

Namely, for example, in case of giving audience to a foreign movie on the LD, it is not possible to select one of languages to be used for a subtitle (caption) displayed on the picture plane (e.g., select one of the subtitle in Japanese and the subtitle in the original language) so as to display the subtitle in the selected language, or, in case of giving audience to a music recorded on the CD, it is not possible to select one of sound voices of the music (e.g., select one of the English lyric and the Japanese lyric).

On the other hand, various proposals and developments are being made as for the DVD, as an optical disk in which the memory capacity is improved by about ten times without changing the size of the optical disk itself as compared with the aforementioned conventional CD. With respect to this DVD, if a plurality of subtitles in various languages or a plurality of voice sounds in various languages are recorded, the above mentioned interactive and variegated reproduction is possible as the audience selects one of them.

However, the information amount of the audio information or music information becomes enormous if the audio or voice sounds in various languages or the musics in various types are recorded on the above mentioned DVD. At this time, if the information is not recorded in an appropriate recording form, the process for searching the audio information etc. to be reproduced becomes complicated, and a case where the audio sound or music sound etc. is interrupted in the middle of the reproduction due to the time required to search the audio information etc. may happen at the time of reproduction, which is a problem.

SUMMARY OF THE INVENTION

It is therefore an object of the present invention to provide: an information recording apparatus which can quickly search the record information, such as audio information and the like to be quickly reproduced, at a time of reproduction, and which can record the record information such that a reproducing operation can be simplified; an information record medium on which the record information is recorded by the information recording apparatus; and an information reproducing apparatus which can reproduce the record information quickly and accurately from the information record medium.

The above object of the present invention can be achieved by an information recording apparatus, provided with: a signal process device for applying a predetermined signal process, such as the MPEG 2 method etc., to record information to be recorded onto an information record medium, such as the DVD etc., to thereby generate processed record information comprising a plurality of information units, such as audio frames, audio access units etc., which are set in advance; a divide device for dividing the processed record information by each record unit, such as an audio packet etc., which includes one or more information units and which is set in advance on the basis of the predetermined signal process; a multiplex device for setting a start position of one or more information units within each record unit, on the basis of control information inputted from the external to control a reproduction of the record information, generating start position information, such as an first access unit pointer etc., indicating the start position and multiplexing the start position information with the processed record information for each record unit, to thereby generate multiplexed processed record information; and a record device, such as a mastering device etc., for recording the multiplexed processed record information onto the information record medium.

According to the information recording apparatus of the present invention, the predetermined signal process is applied to the record information, so that the processed record information comprising a plurality of information units is generated by the signal process device. Then, the processed record information is divided by each record unit, which includes one or-more information units, by the divide device. Then, the start position of one or more information units within each record unit is set on the basis of the control information to control the reproduction of the record information, so that the start position information indicating the start position is generated by the multiplex device. Then, the start position information is multiplexing with the processed record information for each record unit, so that the multiplexed processed record information is generated by the multiplex device. Finally, the multiplexed processed record information is recorded onto the information record medium, by the record device.

Therefore, since the start position information indicative of the start position of the information unit within the record unit is recorded together with the processed record information, it is possible, at a time of reproducing the record information, to quickly search the start position of the information unit on the basis of the start position information and thereby perform the reproduction process of the record information for each information unit on the basis of the searched start position.

Accordingly, it is possible to speedily and surely perform the reproducing process for each information unit at the time of reproducing, and to make the reproducing process on the whole be speedy and simplified.

In one aspect of the information recording apparatus of the present invention, the signal process device applies a predetermined compression process, such as the Dolby AC3 (Digital Audio Compression—3) process etc., as the predetermined signal process to the record information which comprises audio information. The information unit is a compressed information unit, such as an audio access unit etc., in the predetermined compression process. And that, the start position information indicates the start position of a first information unit among the information units which start positions are included in each record unit.

According to this aspect, at a time of reproducing the record information, it is possible to perform the expanding process for each compressed information unit and also possible to quickly search the start position of the information unit.

In another aspect of the information recording apparatus of the present invention, the signal process device applies a predetermined sampling process and a predetermined quantizing process, such as the linear PCM (Pulse Code Modulation) process etc., as the predetermined signal process to the record information which comprises audio information. The information unit comprises sampled values in a predetermined number, such as audio frames etc., which are generated by the predetermined sampling process and the predetermined quantizing process. And that, the start position information indicates the start position of a first information unit among the information units which start positions are included in each record unit.

According to this aspect, at a time of reproducing the record information, it is possible to perform the reproduction process for each information unit and also possible to quickly search the start position of the information unit.

The above object of the present invention can be also achieved by an information record medium, such as the DVD etc., on which record information to be reproduced by an information reproducing apparatus for controlling a reproduction of the record information on the basis of start position information recorded together with the record information on the information record medium is recorded. The information record medium comprises a data structure stored in the information record medium and including: processed record information, which is generated by applying a predetermined signal process to the record information, comprises a plurality of information units, such as audio frames, audio access units etc., which are set in advance, and is divided by each record unit, such as an audio packet etc., which includes one or more information units and is set in advance on the basis of the predetermined signal process; and the start position information, such as a first access unit pointer etc., indicating a start position of one or more information units within each record unit. And that, the start position information and the processed record information are multiplexed with each other for each record unit.

According to the information record medium of the present invention, it has such a structure that the processed record information and the start position information, which indicates the start position of the information unit within the record unit, are multiplexed for each record unit.

Therefore, since the start position information is recorded together with the processed record information, it is possible, at a time of reproducing the record information, to quickly search the start position of the information unit and thereby perform the reproduction process for each information unit.

Accordingly, it is possible to speedily and surely perform the reproducing process for each information unit at the time of reproducing, and to make the reproducing process on the whole be speedy and simplified.

In one aspect of the information record medium of the present invention, the processed record information is generated by applying a predetermined compression process, such as the Dolby AC3 process etc., as the predetermined signal process to the record information which comprises audio information. The information unit is a compressed information unit, such as the audio access unit etc., in the predetermined compression process. And that, the start position information indicates the start position of a first information unit among the information units which start positions are included in each record unit.

According to this aspect, at a time of reproducing the record information, it is possible to perform the expanding process for each compressed information unit and also possible to quickly search the start position of the information unit.

In another aspect of the information record medium of the present invention, the processed record information is generated by applying a predetermined sampling process and a predetermined quantizing process, such as the linear PCM process etc., as the predetermined signal process to the record information which comprises audio information. The information unit comprises sampled values in a predetermined number, such as the audio frames etc., which are generated by the predetermined sampling process and the predetermined quantizing process. And that, the start position information indicates the start position of a first information unit among the information units which start positions are included in each record unit.

According to this aspect, at a time of reproducing the record information, it is possible to perform the reproduction process for each information unit and also possible to quickly search the start position of the information unit.

The above object of the present invention can be also achieved by an information reproducing apparatus for reproducing the record information from the above described information record medium of the present invention. The information reproducing apparatus is provided with: a detection and demodulation device, such as an optical pickup, a demodulate and error correct unit etc., for detecting and demodulating the multiplexed record information from the information record medium to thereby output a demodulation signal; an extract device, such as a demultiplexer etc., for extracting the start position information from the demodulation signal; and a reproduction process device, such as an audio decoder etc., for detecting the start position of one or more information units on the basis of the extracted start position information to thereby perform a reproduction process of the record information for each of the information units.

According to the information reproducing apparatus of the present invention, at first, the multiplexed record information is detected and demodulated from the information record medium, so that the demodulation signal is outputted by the detection and demodulation device. Then, the start position information is extracted from the demodulation signal by the extract device. Then, the start position of the information unit within the record unit is detected on the basis of the extracted start position information, so that the reproduction process of the record information is performed for each of the information units, by the reproduction process device.

Therefore, since the start position information is recorded together with the processed record information, it is possible to quickly search the start position of the information unit and thereby perform the reproduction process of the record information for each information unit.

Accordingly, it is possible to speedily and surely perform the reproducing process for each information unit and to make the reproducing process on the whole be speedy and simplified.

In one aspect of the information reproducing apparatus of the present invention, the processed record information is generated by applying a predetermined compression process, such as the Dolby AC3 process etc., as the predetermined signal process to the record information which comprises audio information. The information unit is a compressed information unit, such as the audio access unit etc., in the predetermined compression process. And that, the start position information indicates the start position of a first information unit among the information units which start positions are included in each record unit.

According to this aspect, it is possible to perform the expanding process for each compressed information unit and also possible to quickly search the start position of the information unit.

In another aspect of the information reproducing apparatus of the present invention, the processed record information is generated by applying a predetermined sampling process and a predetermined quantizing process, such as the linear PCM process etc., as the predetermined signal process to the record information which comprises audio information. The information unit comprises sampled values in a predetermined number, such as the audio frames etc., which are generated by the predetermined sampling process and the predetermined quantizing process. And that, the start position information indicates the start position of a first information unit among the information units which start positions are included in each record unit.

According to this aspect, it is possible to perform the reproduction process for each information unit and also possible to quickly search the start position of the information unit.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 3A is a diagram showing a structure of an audio pack in case of the linear PCM method;

FIG. 3B is a diagram showing a structure of an audio pack in case of the Dolby AC3 method;

DETAILED DESCRIPTION OF THE PREFERRED EMBODIMENTS

Referring to the accompanying drawings, embodiments of the present invention will be now explained. The following explanations will be done for the embodiments, in which the present invention is applied to the aforementioned DVD.

In the following embodiments, constitutional elements listed on a right hand side in a following list respectively construct examples of constitutional elements of the present invention listed on a left hand side in the following list.

record information: audio information etc. to be recorded onto the DVD before predetermined process processed record information: substantial portion of audio data in an audio pack information unit: audio frame or audio access unit record unit: audio packet starting position information: first access unit pointer (I) Embodiment of Information Record Medium First of all, a physical structure and a logical structure as well as an operation of a DVD, as one embodiment of the information record medium to which the present invention is applied, will be explained with reference to FIGS. 1 to 9.

Figure 1:
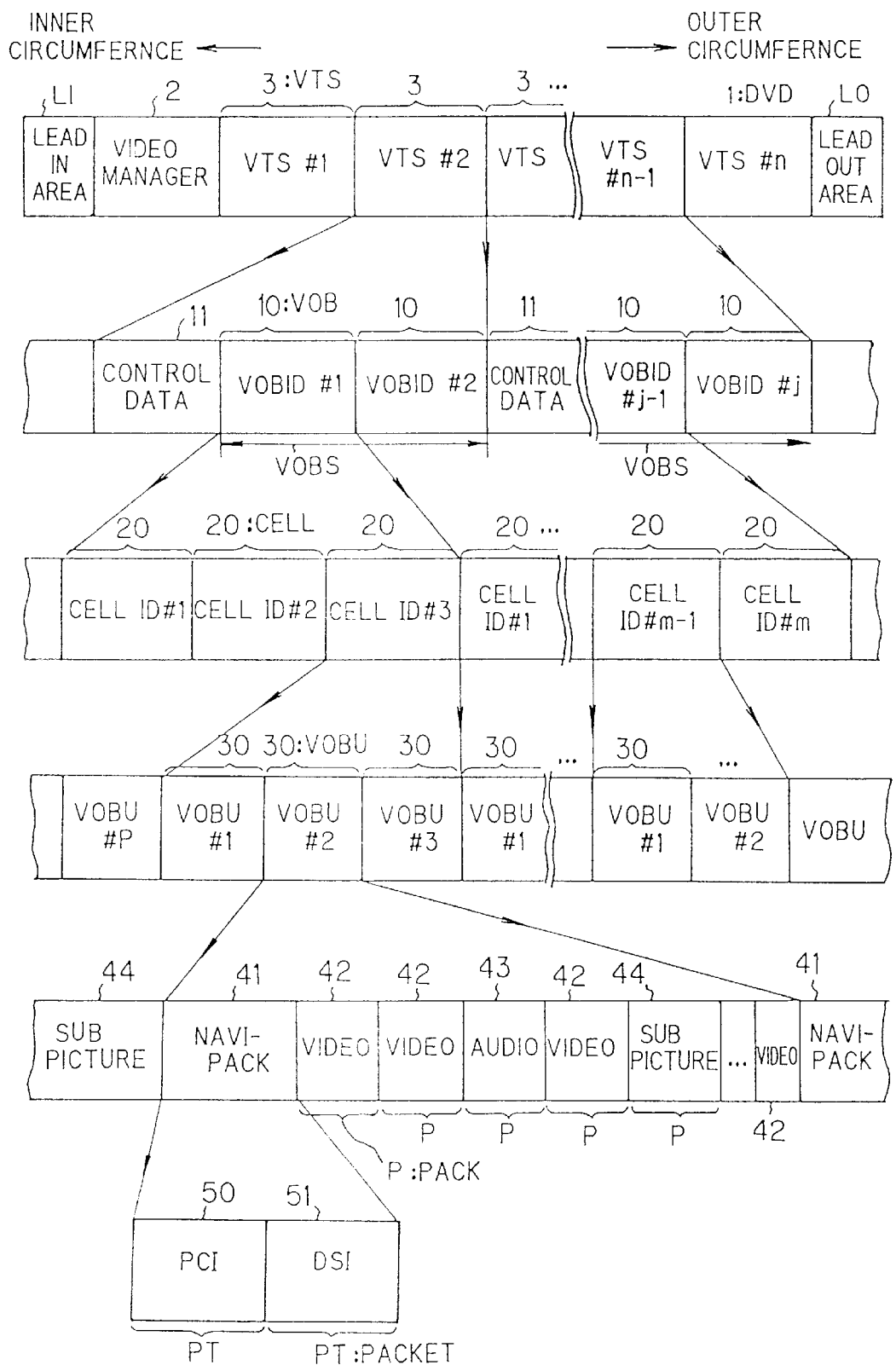
FIG. 1 is a diagram showing a physical structure of record information of a DVD as one embodiment of the present invention.
Figure 2:
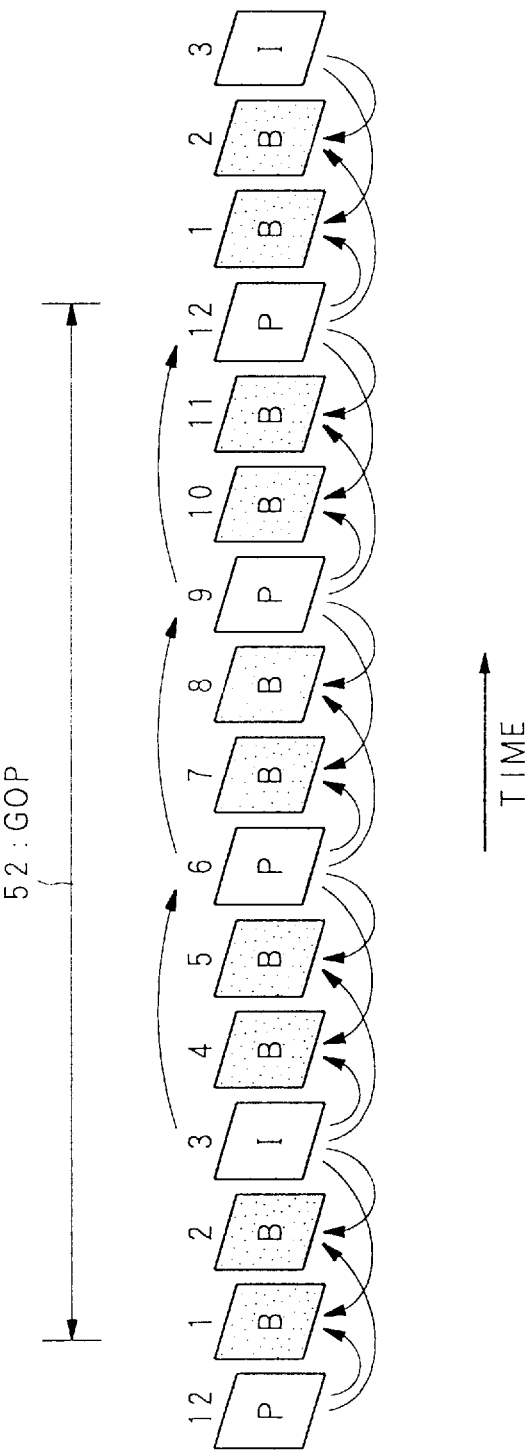
FIG. 2 is a diagram showing frame pictures constructing a GOP.

At first, a record format of video information and audio information on the DVD (i.e. a physical record format) is explained by use of FIGS. 1 to 3.

As shown in FIG. 1, a DVD 1 as the present embodiment is provided with a lead in area LI at its most inner circumferential portion and a lead out area LO at its most outer circumferential portion, between which video information and audio information are recorded such that they are divided into a plurality of VTSs 3, each of which has a unique ID (Identification) number (i.e. VTS#1 to VTS#n). Here, the VTS (Video Title Set) 3 is a set (bundle) of titles (each of which is one production or one work which an author or producer intends to offer to the audience), which are related to each other (e.g., which attribute, such as the number, the specification, the corresponding languages etc. of the audio information and sub picture information included therein, is the same to each other). More concretely, a plurality of movies which are related to the same movie to each other but which languages of serifs (lines) are different from each other may be recorded as different titles respectively, or even in case of the same movies, the theater version and the special version may be recorded as different titles respectively. Ahead of the area where the VTSs 3 are recorded, a video manager 2 is recorded as shown in FIG. 1. As the information recorded in the video manager 2, for example, information related to the whole video and audio information recorded on the DVD 1, such as a menu for showing a name of each title, information for preventing an illegal copy, an access table for accessing each title and so on, is recorded.

One VTS 3 is recorded such that it is divided into a plurality of VOBs 10, each of which has an ID number (VOB ID#1, VOB ID#2, . . . ), and control data 11 disposed ahead of the VOBs 10. Here, a data portion constructed by a plurality of VOBs 10 is defined as a VOB set (VOBS) as shown in FIG. 1. This VOB set is defined to distinguish the VOB 10, which constructs one portion of the VTS 3 as the substantial portion of the video and audio information, from the control data 11, which constructs another portion of the VTS 3.

In the control data 11 recorded at the head of the VTS 3, information such as PGCI (ProGram Chain Information), which is various information related to a program chain as a logical division obtained by combining a plurality of cells (the "cell" will be described later in detail), is recorded. In each VOB 10, the substantial portion of the video and audio information (i.e. the video and audio information itself other than control information) besides the control information are recorded.

Further, one VOB 10 is constructed of a plurality of cells 20, each of which has an ID number (cell ID#1, cell ID#2, . . . ). Here, one VOB 10 is constructed such that it is completed by the plurality of cells 20 and that one cell 20 does not strides over two VOBs 10.

Nextly, one cell 20 is constructed of a plurality of VOB units (VOBUs) 30, each of which has an ID number (VOBU#1, VOBU#2, . . . ). Here, the VOB unit 30 is an information unit, each of which includes at least one of the video information, the audio information and sub picture information (which is defined as information of a sub picture such as a subtitle of a movie etc.), or each of which includes only a navi(navigation)-pack described later.

One VOB unit 30 is provided with: a navi-pack (a navigation pack) 41 for storing control information to control the video information etc. included in the pertinent VOB unit 30, as a control object; a video data 42 as the video information; an audio data 43 as the audio information; and a sub picture data 44 as the sub picture information. Here, in a pack P for the video data 42, only the video data is recorded. In a pack P for the audio data 43, only the audio data is recorded. Further, in a pack P for the sub picture data 44, only graphic data of a character, a diagram or the like as the sub picture, is recorded. In the video packs 42, which data amount is relatively large as shown in FIG. 1, one or a plurality of GOPs are recorded within one VOB unit 30. The audio data 43 and the sub picture data 44 are disposed intermittently between the video packs 42. It is prescribed by a standard specification of the DVD that there are 8 kinds of audio recordable on the DVD 1 while 32 kinds of sub picture recordable on the DVD 1.

These data are recorded such that the reproduction time corresponding to one VOB unit 30 (i.e. the reproduction time corresponding to the data recorded between one navi-pack 41 and another navi-pack 41 adjacent to said one navi-pack 41) is not shorter than 0.4 seconds.

Further, there always exists the navi-pack 41 in one VOBU 30 at the head thereof. On the other hand, there may not exist each of the video data 42, the audio data 43 and the sub picture data 44 in one VOBU 30, or, even in case that the packs P for these data exist in one VOBU 30, the number of the packs P and the order of the packs P are freely determined.

Here, a division of each of the video data 42, the audio data 43 and the sub picture data 44 as shown in FIG. 1, is called as a pack P. Namely, in one VOB unit 30, the video data 42, the audio data 43 and the sub picture data 44 are divided into packs P respectively and recorded, wherein the pack P in which the video data 42 is recorded is called as a video pack, the pack P in which the audio data 43 is recorded is called as an audio pack, and the pack P in which the sub picture data 44 is recorded is called as a sub picture pack. These packs P are record units set in correspondence with a packing process in the MPEG 2 method, which is employed at the time of recording the record information onto the DVD 1 in the present embodiment.

Further, a reading start time information, which is called as a SCR (System Clock Reference), a start code indicating a start of the pack P and the like are recorded at a pack header recorded at the head of each pack P. This SCR indicates a reading start time on a time axis of reproduction time, at which reading the data included in each pack P from the track buffer in the reproducing apparatus described later and inputting the read data into each buffer are to be started. On the other hand, as for each pack P, the video data 42, the audio data 43 or the sub picture data 44 is recorded in each packet, which is generally a record unit obtained by dividing the pack P more finely. In the DVD 1 of the present embodiment, one pack P consists of one packet PT in general.

Finally, the navi-pack 41 is provided with: a DSI (Data Search Information) data 51 in a packet PT including search information to search a video image or an audio sound desired to be displayed or sound-outputted (concretely, search information such as an address, where the video or audio to be displayed or sound-outputted is recorded, on the DVD 1); and a PCI (Presentation Control Information) data 50 in a packet PT including information related to a display control at a time of displaying the video image or outputting the audio sound, which is searched on the basis of the information of the DSI data 51. Here, the DSI data 51 and the PCI data 50 construct, as the packets, a DSI packet and a PCI packet respectively, and then are recorded. Further, all video data 42 included in one VOBU 30 consist of at least one GOP (Group Of Pictures) each having an ID number.

In the PCI data 50, high light information, which defines a display or operation at a time when one selection item is selected out of selection items by the audience, is included. By the high light information, for example, the change of the picture plane display for a selection item as well as the display position to be changed in correspondence with the selection item, on a special picture plane of selection items (i.e. a so-called menu picture plane) for the audience to select, and the command corresponding to the selected item (i.e. a command to be performed in correspondence with the selected item) are set.

Further, the video information to construct and display a frame, a selection button and the like, which is required to construct and display the menu picture plane, is recorded in the sub picture data 44 as the sub picture information.

Information to set a value of a register (memory) in a system controller of a reproducing apparatus described later may be included in the high light information. This point is explained by use of a case where the record information recorded on the DVD 1 is an educational software, for example. Namely, in case of an educational software, there may be a case where a test question is displayed on a display portion, and then, a plurality of answer candidates may be displayed as selection items for the audience to select, by use of the sub picture data 44. At this time, if the selection item corresponding to the correct answer for the pertinent question is selected by the audience, the system controller adds a predetermined point or score corresponding to the correct answer to a value of the predetermined register included in the system controller, by use of the command information corresponding to the selection items respectively in the high light information, while the system controller does not add the point or score if the selection item corresponding to the incorrect answer is selected. After that, making question and answering are repeated for a predetermined number of questions in the same manner. After finishing all of the answers, the system controller refers to the predetermined register to which the points or scores are accumulated, and, according to other command information (e.g. the command in the PGCI), controls the optical pickup to jump to a record position on the DVD 1 where questions etc. at a next study stage are recorded if the value of the total points is larger than a predetermined value which is set in advance, while controls the optical pickup to jump to a record position where a software for reviewing is recorded if the value of the total points is less than the predetermined value. As in the above explained example, it is possible to set the value of the register in the controller by the high light information.

On the other hand, the above described GOP is a minimum picture unit, which can be independently reproduced and which is determined by a standard based on the MPEG (Moving Picture Experts Group) 2 method. The MPEG 2 method is a picture compression method adopted at a time of recording the video information onto the DVD 1 in the present embodiment.

Here, the outline of the MPEG 2 method is explained. Namely, in general, frame pictures forward and backward of one frame picture in continuous frame pictures are often resembled to each other and have mutual relationships. The MPEG 2 method is a method, which is proposed by paying an attention to this fact, and which generates one frame picture existing between a plurality of frame pictures on the basis of the plurality of frame pictures transferred while they are timely separated by a few or several frames from each other, by means of an interpolating calculation based on moving vectors etc. of the original picture. In this case, if this one frame picture is to be recorded, it is enough to just record the information as for a differential vector and a moving vector thereof with respect to the plurality of frame pictures, so as to reproduce this one frame picture by estimating it from the plurality of frame pictures with referring to these vectors, at a time of reproduction. By this, the compression recording is enabled with respect to the picture.

Further, the scheme of the above explained GOP is explained with reference to FIG. 2. FIG. 2 shows an example of a plurality of frame pictures constituting one GOP. In FIG. 2, a case where one GOP 52 consists of 12 frame pictures is illustrated (in the MPEG 2 method, the number of the frame pictures included in one GOP 52 is not fixed), for example. Among those frame pictures, a frame picture indicated by a reference sign "I" is called as an I picture (Intra-coded picture), which is defined as a frame picture able to be reproduced as a complete frame picture by use of its own picture information. A frame picture indicated by a reference sign "P" is called as a P picture (Predictive-coded picture), which is defined as a frame picture predicted or generated by decoding a difference from a predictive picture compensated and reproduced on the basis of the already decoded I picture or other picture. A frame picture indicated by a reference sign "B" is called as a B picture (Bidirectionally Predictive-coded picture), which is defined as a frame picture predicted or reproduced by use of not only the already decoded I picture or P picture but also the I picture or P picture which is recorded on the optical disk timely in the future relative to the pertinent B picture. In FIG. 2, the relationship in the prediction (i.e. the relationship in the compensation) between the respective pictures are indicated by arrows.

The MPEG 2 method used in the DVD 1 of the present embodiment employs a variable rate method, in which the data amount included in each GOP is not constant. Namely, in case that the respective pictures included in one GOP 52 correspond to a moving picture, which moving speed is rather fast and that the mutual relationship between the respective pictures is relatively small, the data amount constituting the respective pictures is increased, so that the data amount included in one GOP 52 is also increased. On the other hand, in case that the respective pictures included in one GOP 52 correspond to a moving picture which moving speed is rather slow and that the mutual relationship between the respective pictures is relatively large, the data amount constituting the respective pictures is decreased, so that the data amount included in one GOP 52 is also decreased.

On the other hand, as for the audio data 43 on the DVD 1 in accordance with this embodiment, there is one case where the compressed audio data is recorded as the audio data 43, and another case where the non-compressed audio data is recorded as the audio data 43. Now, there is a so-called Dolby AC3 method as a typical compression method in recording the compressed audio data, and there is a so-called linear PCM method, as a typical recording method in recording the non-compressed audio data.

The respective constructions of the audio pack constituting the audio data compressed by the Dolby AC3 method and the audio pack constituting the audio data non-compressed by the linear PCM method are explained with reference to FIGS. 3A and 3B.

At first, the audio pack based on the linear PCM method is explained with reference to FIG. 3A.

As shown in FIG. 3A, an audio pack AP based on the linear PCM method is composed of: at a head or lead portion, a pack header 64 including the above mentioned SCR and the start cord; a packet header 65 including the information indicating that the data contained in the pertinent audio pack AP is the audio data and the like; sub-stream ID information 66 including the information indicating whether the audio data contained in the pertinent audio pack AP is the compressed audio data or the non-compressed audio data such as the data based on this linear PCM method and the like; audio frame information 67 in which a first access unit pointer or audio frame number information described later and the like are described; audio data information 68 which is the information indicating a sampling frequency as the linear PCM method in the audio data 43 included in the audio pack AP, the number of channels included as the audio data 43 (one channel is constituted by audio data outputted by one speaker. For example, in a case of including audio data to be outputted by left and right speakers, the number of channels is "2".), or the number of quantized bits as the linear PCM method in the audio data 43 included in the audio pack AP, or the like; and audio data 43, which is the substantial portion as the audio information and is composed of a plurality of audio frames AF. In the above mentioned configuration, the portions other than the pack header 64 constitute the audio packet APT, in the audio pack AP.

The audio frame AF in the linear PCM method includes the audio information to which only digitalization is applied and compression is not applied, and the audio information to be reproduced is simply divided for each 1/600 seconds on the axis of reproduction time. Thus, each audio frame AF itself does not have a special pattern, such as [7FFh], [FFFh] or the like, which is to be a header. Then, from now, sample value data at the head or lead portion among a plurality of sample value data included in each audio frame AF is referred to as a header, for convenience.

Further, the audio frame AF has a function as a process unit to synchronize the audio information included in the pertinent audio frame AF with other video information or sub-picture information.

Incidentally, the numbers or volumes of the data included in respective audio frames AF are prescribed to be fixed values same to each other.

Next, the audio pack based on the Dolby AC3 method is explained with reference to FIG. 3B.

As shown in FIG. 3B, the audio pack AP based on the Dolby AC3 method is composed of: at the head or lead portion, the pack header 64; the packet header 65; the sub-stream ID information 66; the audio frame information 67 in which the first access unit pointer or the access unit number described later, and the like are described; and the audio data 43, which is the substantial portion as the audio information and is composed of a plurality of audio access units AAu. In the above mentioned configuration, the portions other than the pack header 64 constitute the audio packet APT, in the audio pack AP.

The audio access unit AAu based on the Dolby AC3 method includes the compressed audio information, and is such an information unit that only one audio access unit AAu can be recovered to be the original audio data (i.e., it is possible to expands the audio information included in the audio access unit AAu). Further, the audio access unit AAu has a header H, which indicates a start of each audio access unit AAu (which has a pattern, whose probability of existence is extremely small within the audio data 43 included in the audio access unit AAu (for example, [0877h], [7FFh], [FFFh] or the like)).

Typically, the amounts of the audio informations included in the respective audio access units AAu are fixed values same to each other. However, in case that the amount of the audio information included in one audio access unit AAu is made variable, the information related to a total data amount of the audio access unit AAu, in which the pertinent header is contained, is described within the header H.

In the above explained record format having a hierarchical structure as shown in FIGS. 1 to 3, each division can be freely set according to the author's intention, so as to perform recording on the basis of these set divisions. By performing the reproduction on the basis of a later described logical structure for each of these divisions, the variegated reproduction can be performed.

Nextly, a logical format (logical structure) constructed by combining the information recorded by the physical divisions shown in FIGS. 1 to 3 is explained with reference to FIG. 4. The information is not actually recorded on the DVD 1 in the logical structure of FIG. 4. Instead, information (e.g. access information or time information) to reproduce each data shown in FIGS. 1 to 3 by combining them (especially combining the cells 20) in the logical structure shown in FIG. 4, is recorded on the DVD 1, especially in the control data 11.

Figure 4:
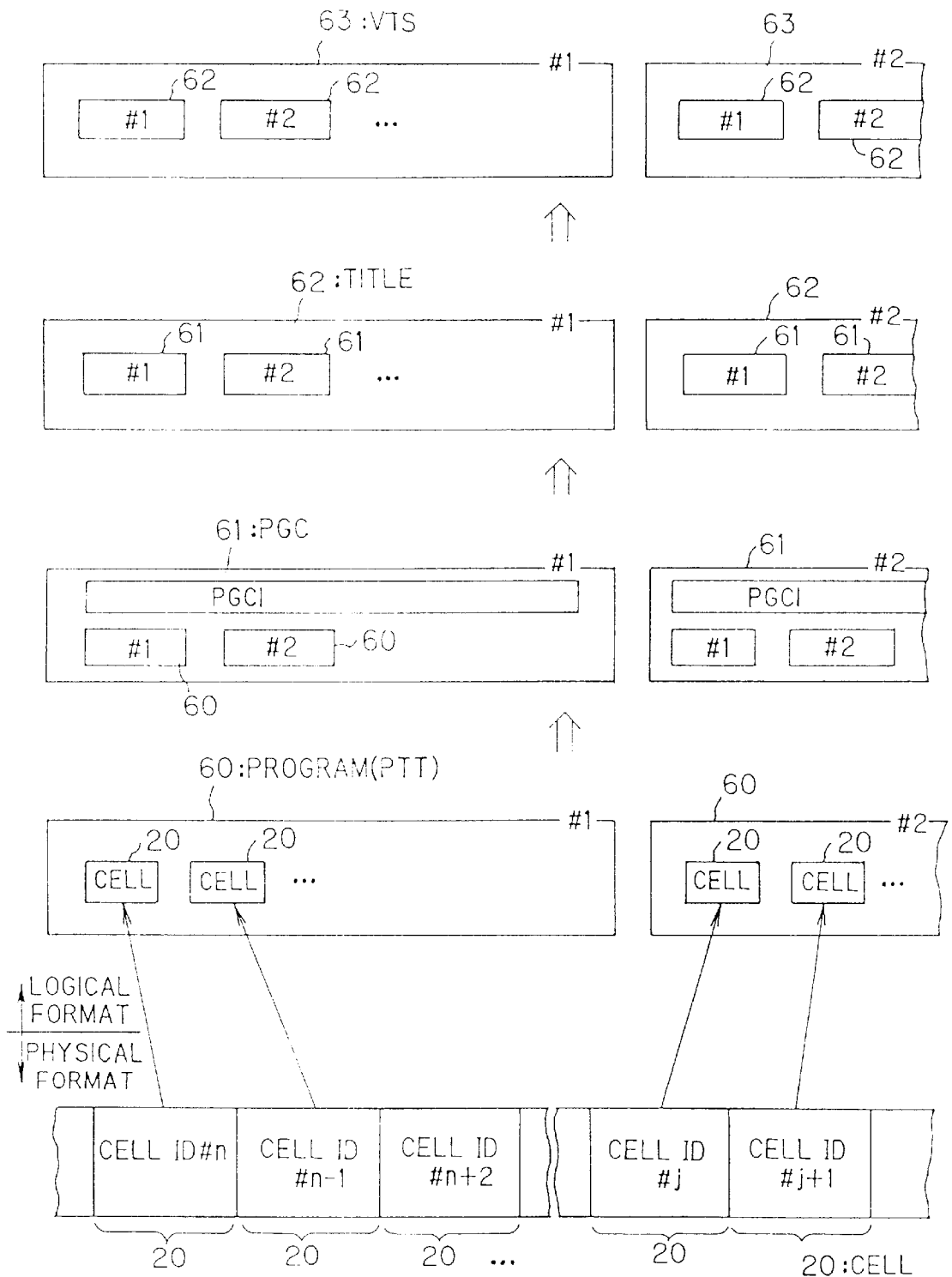
FIG. 4 is a diagram showing a logical structure of the record information of the DVD in FIG. 1.

To make the explanation clear, the following explanation is made from the lower hierarchical layer in FIG. 4. One program 60 is logically constructed on the basis of the author's intention by selecting and combining a plurality of cells 20 among the physical structures explained by use of FIG. 1. The program 60 is also a minimum logical unit, which division can be identified by a system controller of a reproducing apparatus described later and which can be accessed by use of a command by the system controller. It is also possible for the author to define a gathering of one or more programs 60 as a minimum unit, which can be freely selected to be watched or listened to by the audience and which is referred to as a PTT (ParT of Title).

Since one program 60 is logically constructed by selecting a plurality of cells 20, it is possible to use one cell commonly for a plurality of programs 60, namely to perform a so-called "alternative usage" of the cell 20 in which one cell 20 is reproduced in a plurality of different programs 60.

Here, as for the number of each cell 20, at a time of treating the cell 20 on the physical format shown in FIG. 1, the number is treated as the cell ID number (which is indicated by cell ID # in FIG. 1). On the other hand, at a time of treating the cell 20 on the logical format shown in FIG. 3, the number is treated as the cell number in the order of description in the PGCI described later.

Next, by combining a plurality of programs 60, one PGC (Program Chain) 61 is logically constructed on the basis of the author's intention. The aforementioned PGCI (ProGram Chain Information) is defined by a unit of the PGC 61. The PGCI includes information indicating: the reproduction order for each program 60 at a time of reproducing each program 60 (by this reproduction order, a unique program number (#1, #2, . . . ) is assigned to each program 60); the reproduction order for each cell 20 (by this reproduction order, a unique cell number is assigned to each cell 20); an address which is a record position of each cell 20 on the DVD 1; the number of the cell 20 positioned at the head of one program 60 to be firstly reproduced; a reproduction method for each program 60 [it is possible for the author to select one reproduction method out of (i) a random reproduction (which is a random reproduction by use of random numbers, and the same program 60 may be reproduced by a plurality of times), (ii) a shuffle reproduction (which is a random reproduction by use of random numbers in the same manner as the random reproduction, but one program 60 is reproduced just once but not reproduced by a plurality of times), (iii) a loop reproduction (which is a reproduction to reproduce one PGC 61 repeatedly), and (iv) a combination of the loop reproduction with the random reproduction or the shuffle reproduction, as a reproduction method to be employed at a time of reproduction]; and various commands (e.g. commands able to be specified by the author for each PGC 61 or each cell 20). The recording position of the PGCI on the DVD 1 may be in the control data 11 as aforementioned, or in a control data (not illustrated) in the video manager 2 if the pertinent PGCI is related to the menu in the video manager 2 (refer to FIG. 1).

In one PGC 61, the substantial video and audio data etc. are included as a combination of the programs 60 (in other words, the combination of the cells 20) other than the above mentioned PGCI.

Further, in one PGC 61, it is possible to perform the alternative usage of the cell 20 as explained before in the explanation for the program 60 (i.e. such a usage that the same cell 20 is commonly used by a plurality of different PGC 61). As the method of reproducing the cell 20 to be used, the author can select a method of reproducing the cells 20 in an order regardless of the recording order on the DVD 1 (i.e. the method of reproducing the cells discontinuously arranged, for example, the method of reproducing the cell 20 prior which is recorded posterior on the record track) other than a method of reproducing the cell 20 in the recording order on the record track on the DVD 1 as it is (i.e. the method of reproducing the cells continuously arranged).

Then, one title 62 is logically constructed of one or a plurality of PGCs 61 (PGC #1, PGC#2, . . . ) as shown in FIG. 3. The title 62 is, for example, a unit corresponding to one movie, and is completed information which the author would like to offer to the audience of the DVD 1.

Finally, one VTS 63 is logically constructed of one or a plurality of titles 62 (title #1, title #2, . . . ) as shown in FIG. 4. The title 62 included in the VTS 63 has the attributes common to each other. For example, the movies based on one movie but in different languages correspond to the respective titles 62. The information included in one VTS 63 shown in FIG. 4 corresponds to information included in one VTS 3 shown in FIG. 1. Namely, all information included in the logical VTS 63 shown in FIG. 4 is recorded as one VTS 3 in the DVD 1 shown in FIG. 1.

As the author specifies the information divided in the physical structure on the DVD 1 on the basis of the above described logical format, the video image (e.g. the movie image) for the audience to watch is to be formed.

In the explanations for the physical structure shown in FIG. 1, for the easy understanding of the content, it has been explained such that a plurality of cells 20 are recorded in the order of the ID numbers. However, in the DVD 1 of the present embodiment, one cell 20 may be divided into a plurality of interleaved units IU to be actually recorded on the DVD 1, as shown in FIG. 5.

Figure 5:
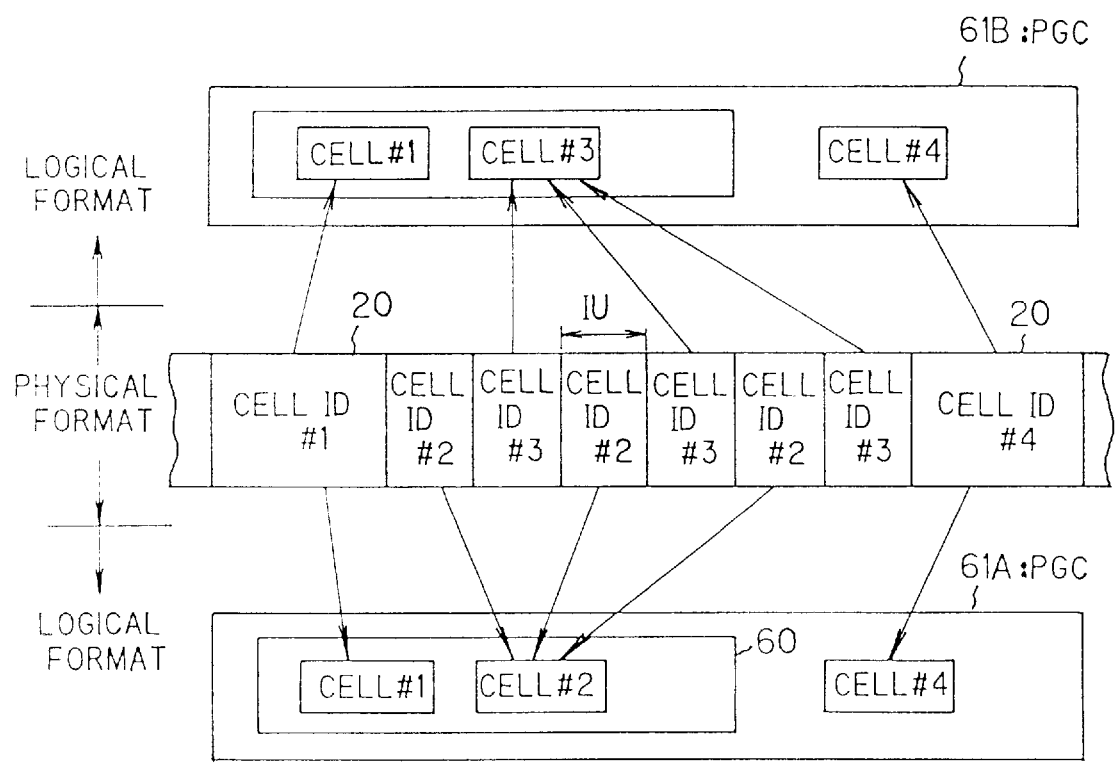
FIG. 5 is a diagram showing a structure of an interleaved unit of the DVD in FIG. 1.

Namely, as shown in FIG. 5, it is assumed that the author constructs one PGC 61A of the cells 20 having the ID numbers 1, 2 and 4, and constructs another PGC 61B of the cells 20 having the ID numbers 1, 3 and 4. In this case, at a time of reproducing the information from the DVD 1 on the basis of the PGC 61A, only the cells having the ID numbers 1, 2 and 4 are reproduced, while, at a time of reproducing the information from the DVD 1 on the basis of the PGC 61B, only the cells 20 having the ID numbers 1, 3 and 4 are reproduced. In the case of the PGC 61A for example, if the cells 20 are recorded spaced from each other for each ID number, a certain time period to jump the optical pickup from the record position of the cell 20 having the ID number 2 on the DVD 1 to the record position of the cell 20 having the ID number 4 on the DVD 1 is required in the reproduction. This results in that the continuous reproduction (hereinafter, it is referred to as a "seamless reproduction") of the cell 20 having the ID number 2 and the cell 20 having the ID number 4 may not be possible depending on a capacity of a track buffer of the reproducing apparatus described later.

Therefore, in the case shown in FIG. 5, the cell 20 having the ID number 2 and the cell having the ID number 3 are divided into interleaved units IU and are recorded by the interleaved units IU, each having a length, which does not destroy the continuity of an output signal of the track buffer even if an input signal to the track buffer is temporarily stopped, in correspondence with an input and output processing speeds at a track buffer of the reproducing apparatus described later (i.e. the interleaved units IU, each having a length which allows the track buffer to continuously output the output signal even if the input signal to the track buffer is ceased while the optical pickup jumps for the interval of one interleaved unit IU). For example, in case of reproduction based on the PGC 61A, only the interleaved units IU constructing the cell 20 corresponding to the ID number 2 are continuously detected to be reproduced. In the same manner, in case of reproduction based on the PGC 61B, only the interleaved units IU constructing the cell 20 corresponding to the ID number 3 are continuously detected to be reproduced. The length of the interleaved unit IU may be determined with considering the capability of a driving mechanism such as a slider motor to perform the track jump, in addition to the memory capacity of the track buffer.

In this manner, by dividing one cell 20 into a plurality of interleaved units IU and recording them according to the author's intention, the signal outputted from the track buffer can be continuous even at a time of reproducing the PGC 61 including the cells 20 having the discontinuous ID numbers, so that it is possible for the audience to watch continuous reproduction video image.

Each interleaved unit IU is completed in one VOB 10, and does not stride over two adjacent VOBs 10. As for the relationship between the interleaved unit IU and the VOB unit 30, one or a plurality of VOB units 30 are included in one interleaved unit IU. One VOB unit 30 is completed in one interleaved unit IU, and is not divided into a plurality of interleaved units IU or does not strides over a plurality of interleaved units IU.

Since it is necessary to record the information at various hierarchy classes explained above, the record information having the above explained recording format is suitable for an information record medium having a large memory capacity, such as the aforementioned DVD 1, which memory capacity is so large that audio voices or subtitles in various kinds of languages in addition to the movie itself can be recorded on a single optical disk as for the audio voice or subtitle of the movie.

Next, especially, the audio frame information 67 in accordance with the present invention, in the video information and the audio information having the above mentioned physical structure and logical structure is explained with reference to FIGS. 6 to 8.

At first, a relationship between the information included in the audio frame information 67 and the actual audio packet APT is explained with reference to FIG. 6. In FIG. 6, an upper stage of FIG. 6 shows a state of only the audio data 43, in which the pack header 64 and the like are not included, which is a state before being divided into each audio packet APT (corresponding to the audio pack AP in this embodiment). A lower stage of FIG. 6 shows a state in which the audio data 43 shown in the upper stage of FIG. 6 is divided into each audio packet APT and a necessary pack header 64 and the like are multiplexed. In the lower stage of FIG. 6, the packet header 65, the sub-stream ID information 66 and the audio data information 68 in the configuration of the audio packet APT are omitted for the easy understanding of the explanation.

Figure 6:
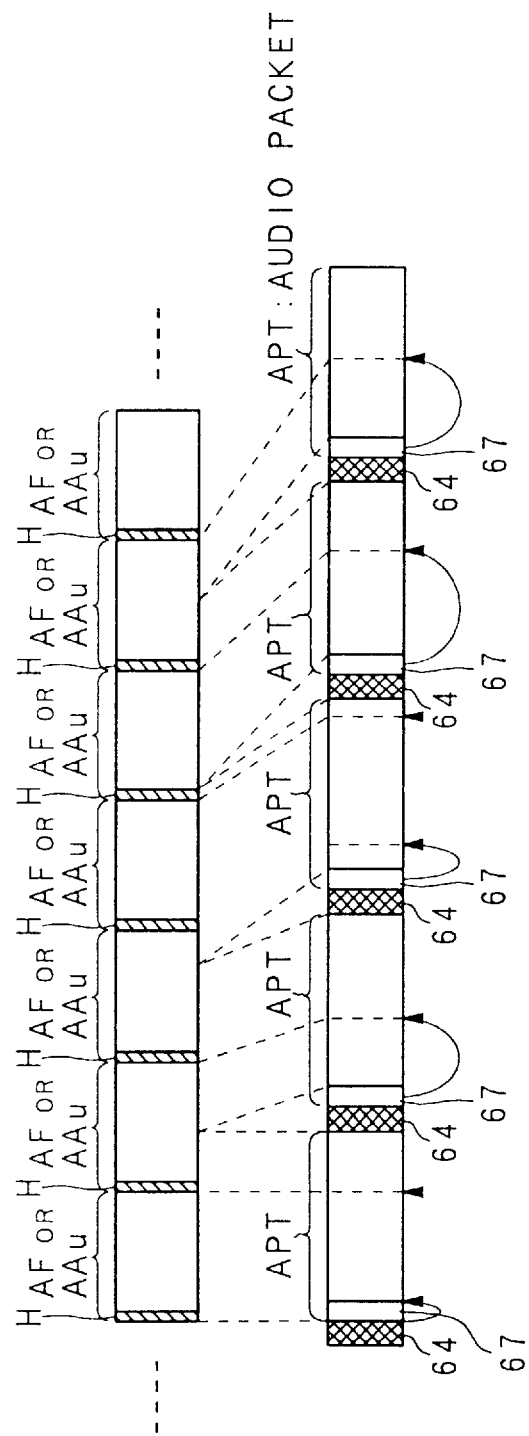
FIG. 6 is a diagram showing a relationship between an audio packet and an audio frame or audio access unit.

In FIG. 6, at least the first access unit pointer and the number of audio frames (or audio access units) indicative of the number of headers of all the audio access units AAu or the audio frames AF included in the audio packet APT is described in the audio frame information 67.

The first access unit pointer among them is the information indicating a start position (the number of bytes from an end position of the audio data information 68 (in a case of the linear PCM method) or the audio frame information 67 (in a case of the Dolby AC3 method)) of the first audio access unit AAu or audio frame AF, among the audio access units AAu or the audio frames AF, which are included in the pertinent audio packet APT and which head or lead portions are included in the pertinent audio packet APT. That is, as shown in the lower stage of FIG. 6, the start position of the first audio access unit AAu or audio frame AF (indicated by an arrow in the lower stage of FIG. 6) among the audio access units AAu or the audio frames AF which head or lead portions are included in the pertinent audio packet APT, which includes the pertinent audio access unit AAu or audio frame AF, is described into each first access unit pointer.

As mentioned above, there is no special pattern different from the header, existing in the audio frame AF. However, in the upper stage of FIG. 6, for the easy understanding of the explanation in relation to the audio access unit AAu, the sample value data of the head portion of one audio frame AF is defined as a header as a matter of convenience, so that the H is described.

As shown in the lower stage of FIG. 6, even if one audio frame AF or audio access unit AAu is divided into two audio packets APT and recorded, it can be recovered to be the original series of the audio frame AF or the audio access unit AAu as shown in the upper stage of FIG. 6, and reproduced, at the time of reproduction.

Next, a relationship between the first access unit pointer and the actual audio data 43 on the actual DVD 1 and the audio stream, in which only the audio data 43 is extracted, in the linear PCM method, is concretely explained with reference to FIG. 7. In FIG. 7, the upper stage of FIG. 7 shows a structure of the audio pack AP on the DVD 1, the middle stage of FIG. 7 shows a system stream composed of each pack on the DVD 1 including the audio pack AP, and the lower stage of FIG. 7 shows an elementary stream, which is an audio stream in which only the audio data 43 is extracted.

Figure 7:
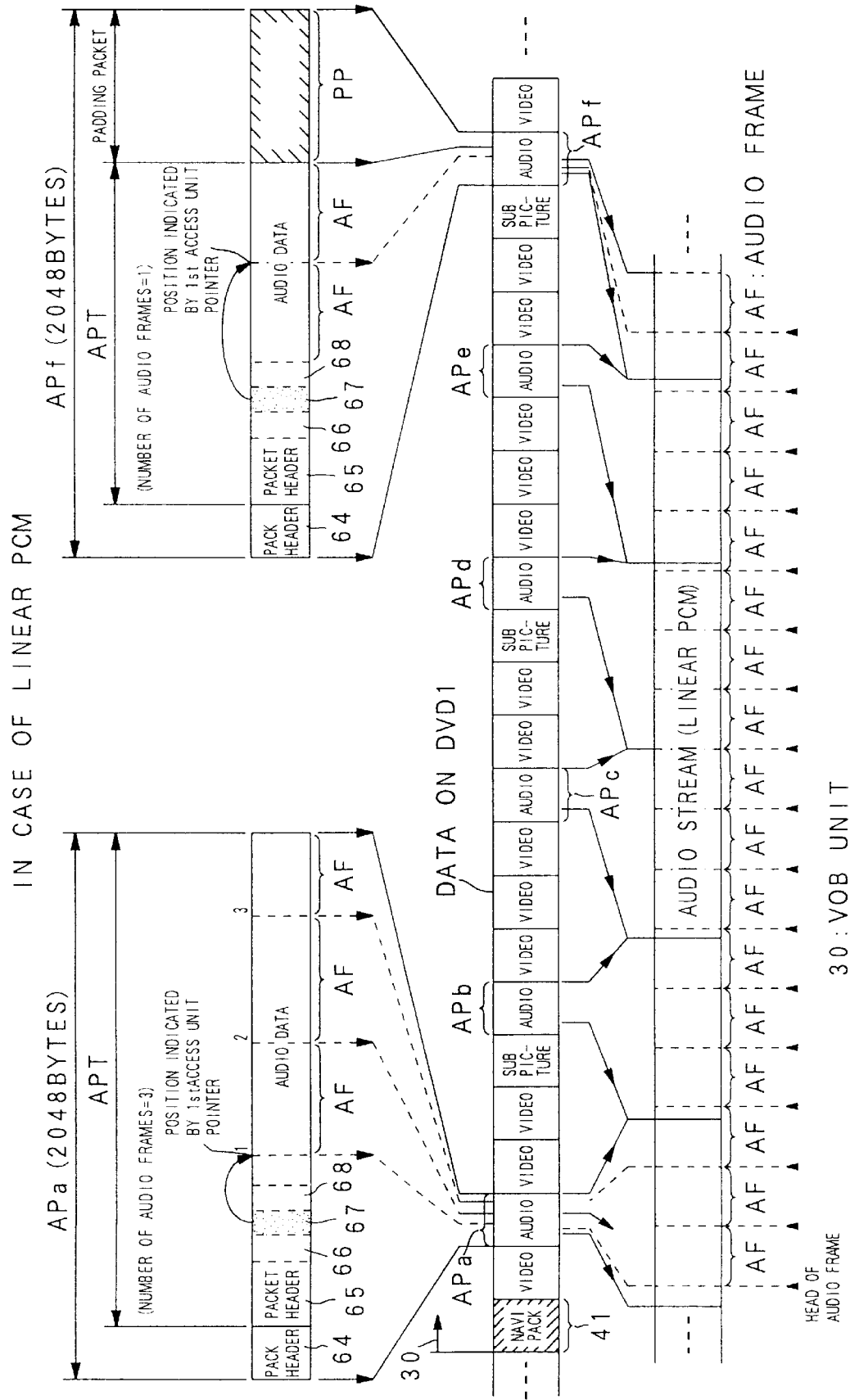
FIG. 7 is a diagram showing a relationship between data on the DVD and an audio stream in case of the linear PCM method.

As shown in the middle stage of FIG. 7, on the DVD 1, each audio pack AP (i.e. Apa to APf) constitutes a VOB unit 30 and is recorded together with the video pack or the sub picture pack, which is another pack, with the navi-pack 41 at the head portion thereof (refer to FIG. 1).

And, one audio pack AP is composed of the pack header 64, the packet header 65, the sub-stream ID information 66, the audio frame information 67, the audio data information 68 and a plurality of audio frames AF, as mentioned above.

As for the audio frame information 67, for example, the number of audio frames is "3" in the audio pack APa as shown on a left side of the upper stage of FIG. 7. The number of bytes from the end position of the audio data information 68 at the head position of the audio frame AF indicated by a solid line arrow is described in the positional information described as the first access unit pointer.

The number of audio frames is "1" in the audio pack APf as shown on a right side of the upper stage in FIG. 7. The number of bytes from the audio data information 68 at the head position of the audio frame AF indicated by the solid line arrow is described in the positional information described as the first access unit pointer. Incidentally, the audio pack APf indicates such a case that the data amount of the audio data 43 which can be recorded within the audio pack APf is more than that of the audio data 43 to be actually recorded within the audio pack APf. In this case, a padding packet PP including the padding information (for example, [00000 . . .] and the like are described therein) as non-reproduction information which is not reproduced (e.g., a skip of reading is performed) at a time of reproducing the audio data 43 is included in the record area within the remaining audio pack APf.

When only the audio data 43 except the pack header 64 and the like is extracted from these audio packs AP at a time of reproducing, it is possible to obtain the audio stream (audio data) in which the audio frames AF are consecutive as shown in the lower stage of FIG. 7. At this time, the audio data 43 is in a non-compressed state in the audio stream shown in the lower stage of FIG. 7.

Next, a relationship between the first access unit pointer and the actual audio data 43 on the DVD 1 and the audio stream, in which only the audio data 43 is extracted, in the Dolby AC3 method, is concretely explained with reference to FIG. 8. In FIG. 8, an upper stage of FIG. 8 shows a structure of the audio pack AP on the DVD 1, a middle stage of FIG. 8 shows a system stream composed of each pack on the DVD 1 including the audio pack AP, and a lower stage of FIG. 8 shows an elementary stream, which is an audio stream in which only the audio data 43 is extracted.

Figure 8:
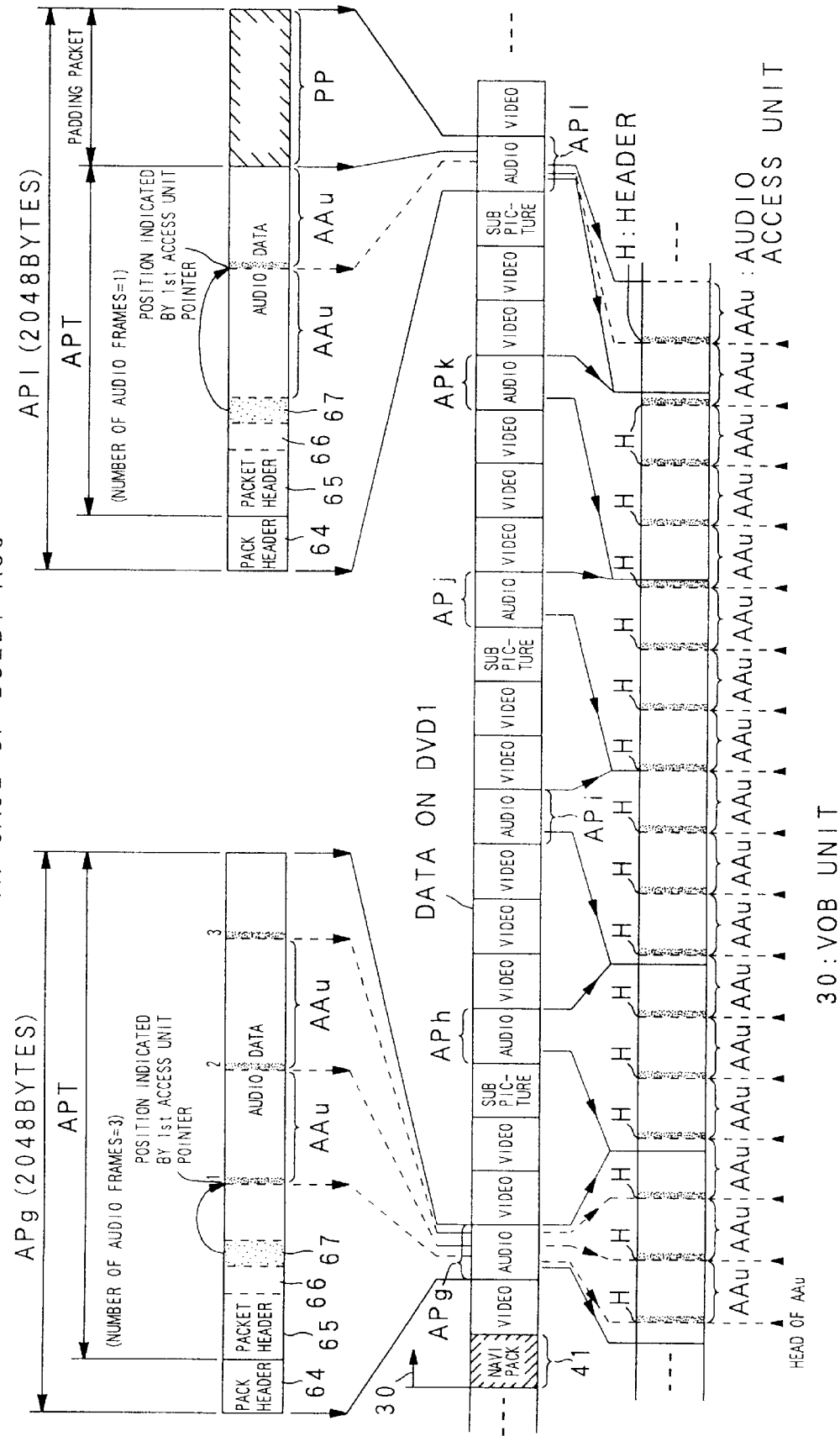
FIG. 8 is a diagram showing a relationship between data on the DVD and an audio stream in case of the Dolby AC3 method.

As shown in the middle stage of FIG. 8, on the DVD 1, each audio pack AP (i.e. Apg to APl) constitutes the VOB unit 30 and is recorded, together with the video pack or sub-picture pack which is another pack, with the navi-pack at the head portion thereof, in the same manner as the case of the linear PCM (refer to FIG. 1).

And, one audio pack AP is composed of the pack header 64, the packet header 65, the sub-stream ID information 66, the audio frame information 67 and a plurality of audio frames AF.

As for the audio frame information 67, for example, the number of audio frames (indicating the number of audio access units in case of the Dolby AC3 method) is "3" in the audio pack APg as shown on a left side of the upper stage of FIG. 8. The number of bytes from the end position of the audio frame information 67 at the head of the audio access unit AAu indicated by a solid line arrow is described in positional information described as the first access unit pointer.

The number of audio frames is "1" in the audio pack AP1 as shown on a right side of the upper stage of FIG. 8. The number of bytes from the audio frame information 67 at the head of the audio access unit AAu indicated by the solid line arrow is described in the position information described as the first access unit pointer. Incidentally, the audio pack APl indicates such a case that the data amount of the audio data 43 which can be recorded within the audio pack AP1 is more than that of audio data 43 to be actually recorded within the audio pack Apl, in the same manner as the audio pack APf (refer to FIG. 7). In this case, the padding packet PP including the padding information is included in the record area within the remaining audio pack AP1.

When only the audio data 43 except the pack header 64 and the like is extracted from these audio packs AP at a time of reproducing, it is possible to obtain the audio stream (audio data) in which the audio access units AAu are consecutive as shown in the lower stage of FIG. 8. At this time, the audio data 43 is in a compressed state in the audio stream shown in the lower stage of FIG. 8.

Figure 9:
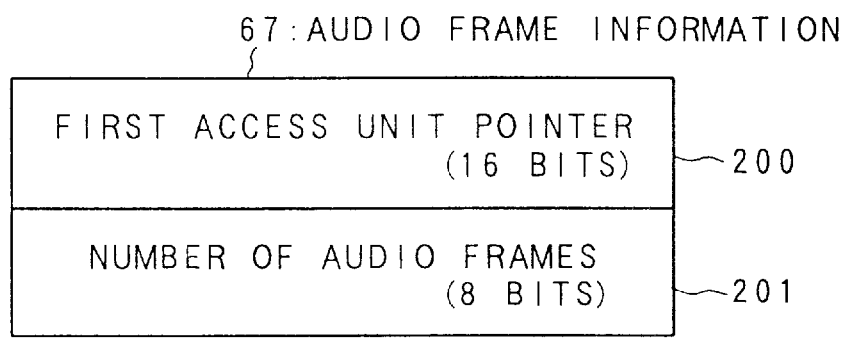
FIG. 9 is a diagram showing a structure of audio frame information.

The first access unit pointer 200 and the number of audio frames information 201 are described within the audio frame information 67 in such a condition that the first access unit pointer 200 has an area of 16 bits and the number of audio frames information 201 has an area of 8 bits, as shown in FIG. 9.

As explained above, by describing the first access unit pointer 200 in the audio frame information 67, it is possible to use the positional information described as the first access unit pointer 200 at a time of reproducing the audio data 43, so as to quickly search the head or lead portion of the audio access unit AAu or the audio frame AF, which are included in the audio packet APT, to thereby perform the reproducing operation corresponding to the Dolby AC3 method or the linear PCM method therefrom.

(II) Embodiment of Recording Apparatus

Next, an embodiment of recording apparatus for recording the above mentioned control information, video information and audio information onto the DVD 1 will be explained with reference to FIGS. 10 and 11.

Figure 10:
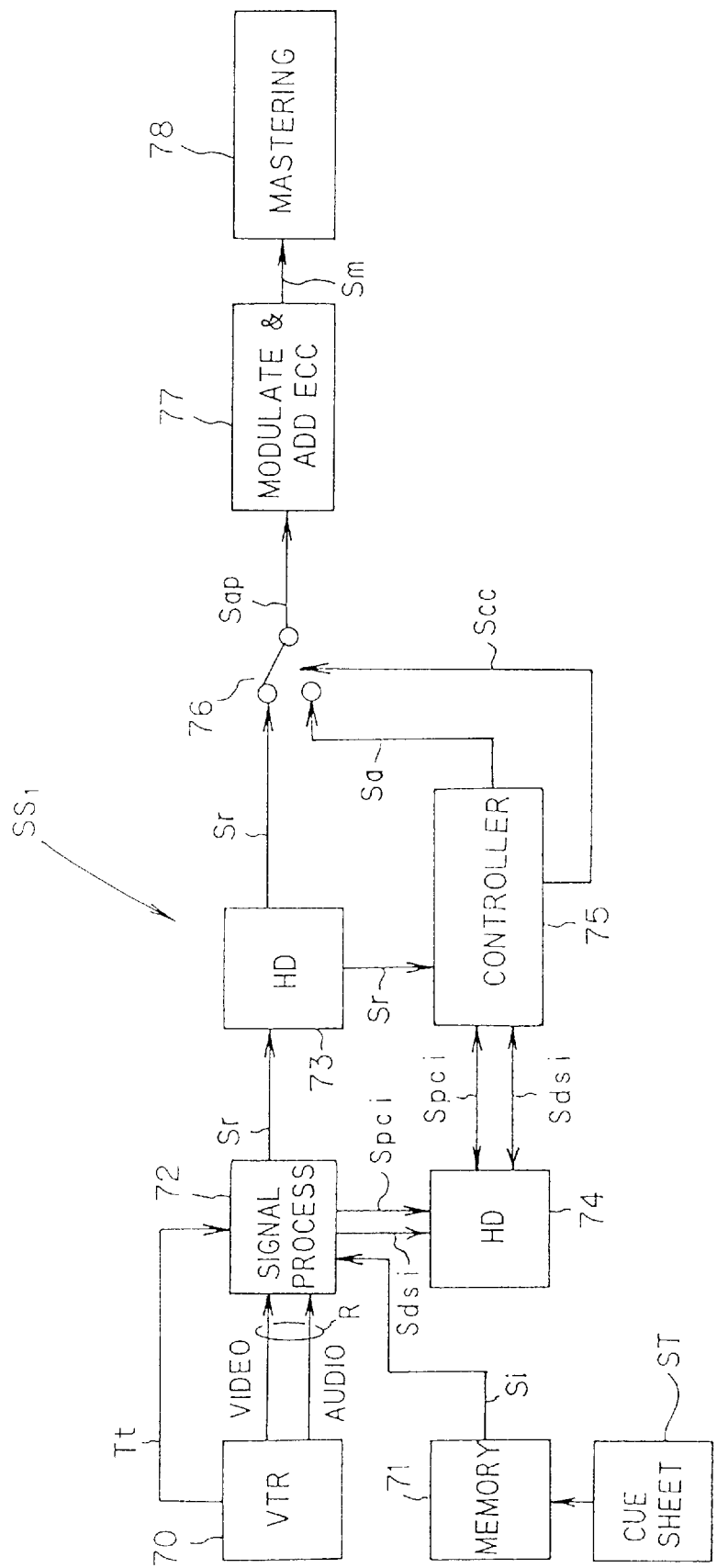
FIG. 10 is a block diagram of a recording apparatus as one embodiment of the present invention.

As shown in FIG. 10, a recording apparatus SS1 as the present embodiment is provided with: a VTR (Video Tape Recorder) 70; a memory 71; a signal process unit 71; a hard disk (HD) device 73; a hard disk (HD) device 74; a controller 75; a multiplexer 76; a modulator 77; and a mastering device 78.

Figure 11:
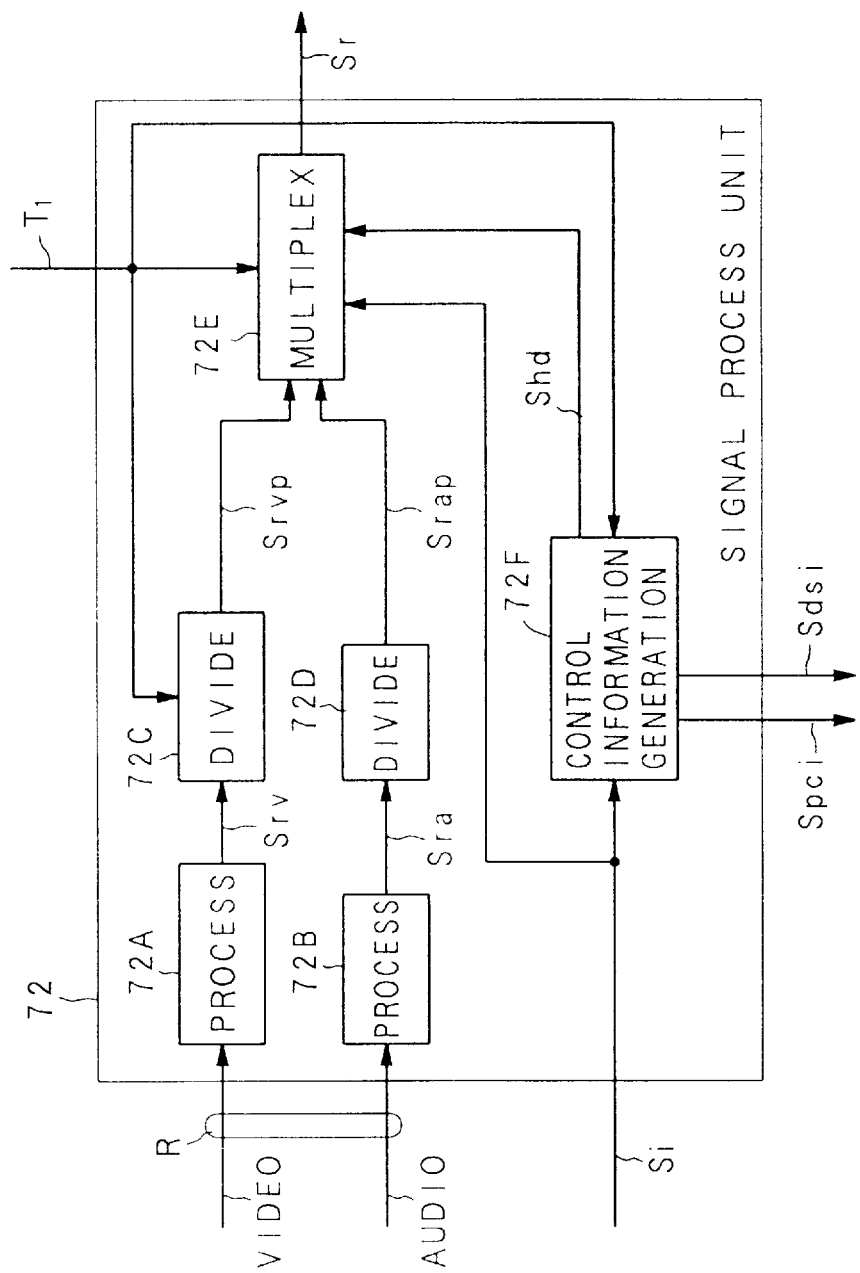
FIG. 11 is a block diagram showing a detailed construction of a signal process unit of the recording apparatus of the embodiment.

As shown in FIG. 11, a signal process unit 72 is provided with a process section 72A, a process section 72B as one example of a signal process means, a divide section 72C, a divide section 72D as one example of a divide means, a multiplexing section 72E as one example of a multiplex means and a control information generation section 72F.

Nextly, an operation of the present embodiment is explained.

Record information R, which is a raw material such as audio information, video information etc. to be recorded on the DVD 1, is temporarily recorded in the VTR 70 for each information. Then, the record information R temporarily record in the VTR 70 is outputted to the signal process unit 72 by a request from the signal process unit 72 per each audio information or video information.

The process section 72A in the signal process unit 72 performs an A/D (Analog to Digital) conversion of the inputted video information, then performs a compression process of it by using the MPEG 2 method, and outputs a processed picture signal Srv composed of the GOP 52. The divide section 72C divides the processed picture signal Srv into the units to be recorded as the video packs (refer to FIG. 1) including one or more GOPs 52, on the basis of the time code Tt corresponding to the record information R outputted by the VTR 70, and outputs a divided processed picture signal Srvp.

On the other hand, the process section 72B included in the signal process unit 72 quantizes the inputted audio information by 24 bits, for example as the number of quantized bits, and outputs a processed tone signal Sra, in a case of recording the audio information by use of the linear PCM method.

In a case of recording the audio information by use of the Dolby AC3 method, the process section 72B performs the compression process of the inputted audio information by the Dolby AC3 method, and outputs the processed tone signal Sra including a plurality of audio access units AAu.

Then, the divide section 72D divides the audio data 43 of 24 bits quantized at each quantization timing included in the processed tone signal Sra, into high order bit data of the high order 16 bits and low order bit data of the low order 8 bits, per each quantization timing, in a case of processing the audio information by use of the linear PCM method. Then, the divide section 72D generates the audio frames AF respectively having the high order bit data and the low order bit data in the predetermined number of bits, and further divides them into each audio pack AP having one or more audio frames AF. Then, the divide section 72D outputs it as a divided processed tone signal Srap.

At this time, the audio frame AF included in the divided processed tone signal Srap contains a high order bit data block composed of the high order bit data corresponding to an even-numbered quantization timing, and the high order bit data corresponding to an odd-numbered quantization timing, which are extracted from the high order bit data corresponding to each quantization timing. The audio frame AF also contains a low order bit data block composed of the low order bit data corresponding to an even-numbered quantization timing and the low order bit data corresponding to an odd-numbered quantization timing, which are extracted from the low order bit data corresponding to each quantization timing.

On the other hand, in a case of processing the audio information by use of the Dolby AC3 method, the divide section 72D divides the audio data 43, which is included in the process tone signal Sra, compression-processed and composed of the audio access units AAu, into each audio pack AP having one or more audio access units AAu, and outputs it as the divided processed tone signal Srap.

Incidentally, the pack header 64, the packet header 65, the audio frame information 67 and the like to constitute the audio pack AP and the audio packet APT are not multiplexed at the stage of the divided processed tone signal Srap.

On the other hand, the control information generation section 72F generates, on the basis of control information Si described later, the pack header 64, the packet header 65, the sub-stream ID information 66, the audio frame information 67 including the first access unit pointer 200 and the audio frame number information 201, the audio data information 68 (as for the audio data information 68, only in a case of processing the audio information by use of the linear PCM method) and the like, and outputs them as a header signal Shd.

Next, the pack header 64, the packet header 65, the substream ID information 66, the audio frame information 67 including the first access unit pointer 200 and the audio frame number information 201, the audio data information 68 and the like, which are included in the header signal Shd, are multiplexed with the divided processed tone signal Srap, by the multiplex section 72 E, and the audio pack AP in its final form is formed.

Similarly, the pack header and the like are multiplexed with the divided processed picture signal Srvp by the multiplex section 72E, and the video pack is formed. Then, the video pack and the audio pack AP are multiplexed with each other for each pack, on the basis of the time code Tt, and are outputted as a multiplexed signal Sr. After that, the outputted multiplexed signal Sr is transiently stored in the hard disk device 73. In this multiplexed signal Sr, the video pack and the audio pack AP are in such a multiplexed state with each other for each pack, as shown in the middle stage of FIG. 7 or the middle stage of FIG. 8.

Along with this, the memory 71 classifies the record information R into a plurality of partial record information Pr in advance, and temporarily stores control information related to the partial record information Pr which is inputted beforehand on the basis of a cue sheet ST, on which the control information for controlling the reproduction of the record information R (e.g. the video manager 2, the control data 11, the navi-pack 41 including the PCI data 50 and the DSI data 51, the pack header to construct the respective audio packs AP and so on) are written. Then, the memory 71 outputs it as a control information signal Si on the basis of a request from the control information generation section 72F in the signal process unit 72. The header signal Shd, which includes the pack header 64, the packet header 65, the sub stream ID information 66, the audio frame information 67 etc., is outputted to the multiplex section 72E.

Then, the signal process unit 72 separates or extracts the PCI data 50 and the DSI data 51 from the control information with referring to a time code Tt, and outputs them as respectively corresponding PCI data signal Spci and DSI data signal Sdsi, on the basis of the time code Tt corresponding to the record information R outputted from the VTR 70 and the control information signal Si outputted from the memory 71. Then, the PCI data signal Spci and DSI data signal Sdsi are temporarily stored in the hard disk device 74. At this time, control informations other than the PCI data 50 and the DSI data 51 are, although they are not illustrated in FIGS. 10 and 11, also respectively separated or extracted by the signal process unit 72 in the same manner as the PCI data 50 and the DSI data 51, and are stored into the hard disk device 74.

The above described processes are performed with respect to the whole record information R.

When the above described processes are finished as for the whole record information R, the controller 75 reads out the multiplexed signal Sr from the hard disk device 73, reads out the PCI data signal Spci and the DSI data signal Sdsi as well as other control informations from the hard disk device 74, generates additional information DA, which includes independently each of the PCI data 50, the DSI data 51 and the other control informations, on the basis of these read out signals, and temporarily stores the additional information DA into the hard disk device 74. This is because there may be control information, which content is determined in dependence upon a generation result of the multiplexed signal Sr among various control informations.

On the other hand, the controller 75 performs a time management for each of the operations of the signal process unit 72, the hard disk device 73 and the hard disk device 74, and reads out the additional information DA, which includes the PCI information signal Spci and the DSI information signal Sdsi, from the hard disk device 74, so that the controller 75 generates and outputs an additional information signal Sa corresponding to the read out additional information DA, and generates and outputs an information selection signal Scc to time-axis-multiplex the multiplexed signal Sr and the additional information signal Sa.

After that, the multiplexed signal Sr and the additional information signal Sa are read out from the hard disk device 73 or 74 on the basis of the information selection signal Scc from the controller 75, and are time-axis-multiplexed by the multiplexer 76 to be outputted as an information added multiplexed Sap. The information to be recorded at the stage of this information added multiplexed signal Sap has the physical structure (physical format) as shown in FIG. 1 and the middle stage of FIG. 7 or 8, as the control information, the video information and the audio information are multiplexed by the switching operation by use of the information selection signal Scc of the controller 75. Each audio pack AP has the structure shown in FIG. 3A or 3B depending on the respective process method (i.e. the linear PCM method or the Dolby AC 3 method). And that, the PCI data 50 and the DSI data 51 are independently included in the navi-pack 41 respectively.

If there exists the sub picture information to be recorded in the informations to be recorded, it is inputted, by other means such as a hard disk device not illustrated, to the signal process unit 72, so that it is processed in the same manner as the video and audio information thereat, so that it is included in the information added multiplexed signal Sap.

After that, the modulator 77 adds an error correction code (ECC), such as a Reed Solomon code, and applies a modulation such as an eight to sixteen (8–16) modulation with respect to the information added multiplexed signal Sap outputted from the multiplexer 76, and generates and outputs a disk record signal Sm to the mastering device 78.

Finally, the mastering device 78 records the disk record signal Sm to a stamper disk, which becomes a master (i.e. a cutting dye) for the production of an optical disk. Then, by use of this stamper disk, an optical disk as a replica disk, which can be on sale in the general market, i.e. the DVD 1, can be produced by a replication device not illustrated.

As described above, according to the recording apparatus SS1 of the present embodiment, since the first access unit pointer 200 indicative of the start position of the audio frame AF or the audio access unit AAu in the audio packet APT is recorded on the DVD 1 together with the audio data 43, it is possible to quickly search the start position of the audio frame AF or the audio access unit AAu on the basis of the first access unit pointer 200 at a time of reproducing the audio data 43 to thereby, based thereon, perform the reproduction process of the audio data 43 for each audio frame AF or each audio access unit AAu.

In a case that the audio data 43 is compressed by the Dolby AC3 method, it is possible to quickly search the head portion of the audio access unit AAu and to thereby perform the expanding process for each audio access unit AAu.

In a case that the audio data 43 is quantized by the linear PCM method, it is possible to quickly search the head portion of the audio frame AF and to thereby perform the reproduction process for each audio frame AF.

(III) Embodiment of Reproducing Apparatus

Next, an embodiment of reproducing apparatus for reproducing the information recorded on the DVD 1 by the above mentioned recording apparatus SS1 will be explained with reference to FIGS. 12 to 14B.

At first, a construction and an operation of the reproducing apparatus as the embodiment is explained with reference to FIG. 12.

Figure 12:
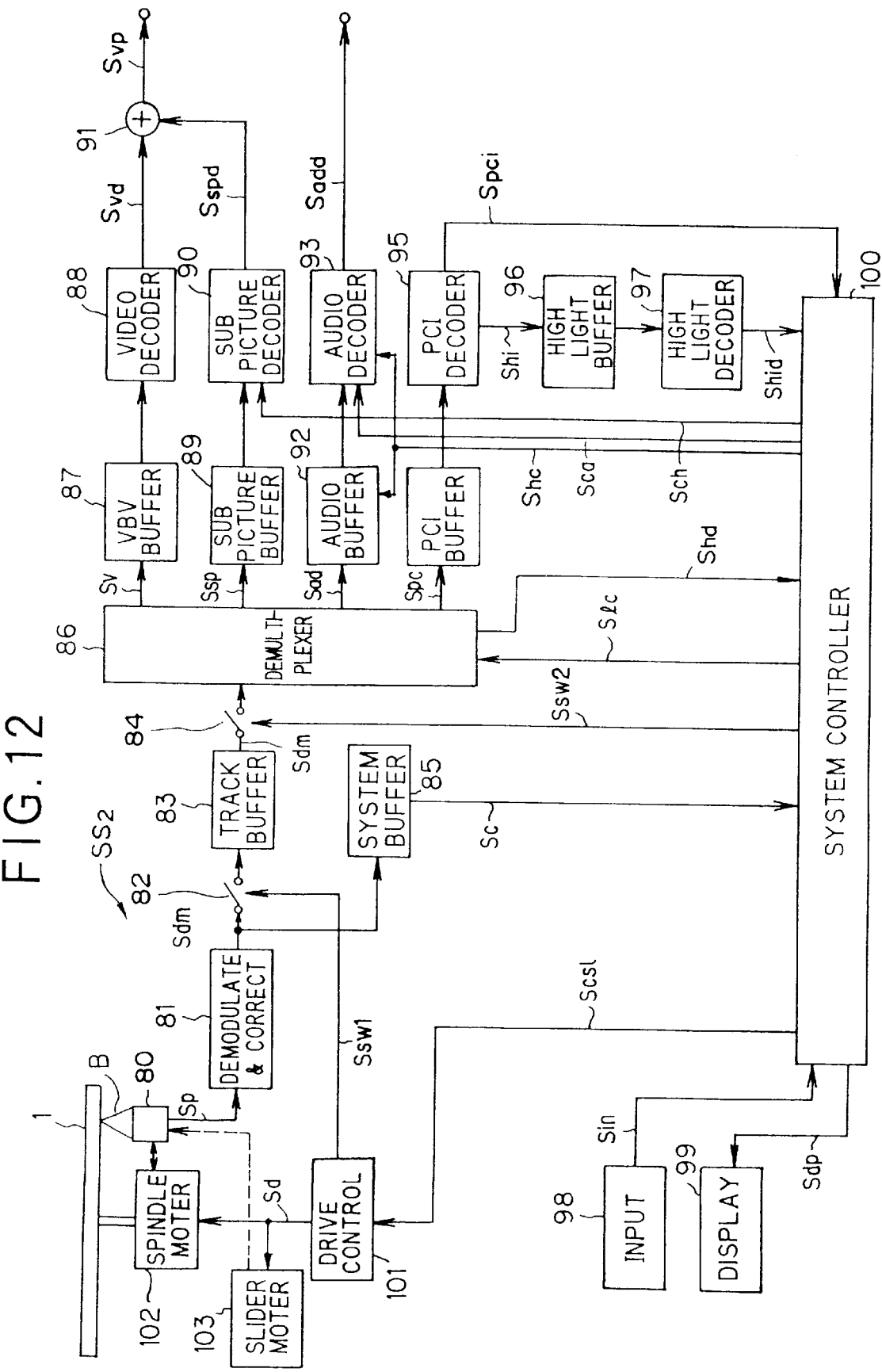
FIG. 12 is a block diagram of a reproducing apparatus as another embodiment of the present invention.

As shown in FIG. 12, a reproducing apparatus SS2 as the present embodiment is provided with: an optical pickup 80; a demodulate and correct unit 81; stream switches 82 and 84; a track buffer 83; a system buffer 85; a demultiplexer 86; a VBV (Video Buffer Verifier) buffer 87; a video decoder 88; a sub picture buffer 89; a sub picture decoder 90; a mixer 91; an audio buffer 92; an audio decoder 93; a PCI (Presentation Control Information) buffer 94; a PCI decoder 95; a high light buffer 96; a high light decoder 97; an input unit 98; a display unit 99; a system controller 100; a drive controller 101; a spindle motor 102; and a slider motor 103. The construction shown in FIG. 12 only illustrates the portions related to the video and audio reproduction of the reproducing apparatus SS2. The description and the detailed explanation as for servo circuits to servo-control the optical pickup 80, the spindle motor 102, the slider motor 103 and the like are omitted since they are constructed in the same manner as the conventional arts.

Nextly, an overall operation of the present embodiment is explained.

The optical pickup 80 includes a laser diode, a polarization beam splitter, an objective lens, a photo-detector and the like not illustrated, and irradiates a light beam B as a reproduction light with respect to the DVD 1. The optical pickup 80 receives a reflection light of the light beam B from the DVD 1, and outputs a detection signal Sp corresponding to information pits formed on the DVD 1. At this time, the tracking servo control and the focus servo control are operated with respect to the objective lens etc. of the optical pickup 80 in the same manner as the conventional art so that the light beam B can be irradiated precisely onto the information track of the DVD 1 and that the light beam B can be focused on the information record surface of the DVD 1.

The detection signal Sp outputted from the optical pickup 80 is inputted to the demodulate and correct unit 81, where a signal demodulation process and an error correct process are applied to it to generate a demodulation signal Sdm, which is outputted to the stream switch 82 and the system buffer 85.

The opening and closing operation of the stream switch 82, to which the demodulation signal Sdm is inputted, is controlled by a switch signal Ssw1 from the drive controller 101. When it is closed, the stream switch 82 passes therethrough the inputted demodulation signal Sdm as it is to the track buffer 83. Then it is opened, the demodulation signal Sdm is not outputted therethrough, so that unnecessary or useless information (signal) is not inputted to the track buffer 83.

The track buffer 83, to which the demodulation signal Sdm is inputted, consists of a FIFO (First In First Out) memory, for example. The track buffer 83 temporarily stores the inputted demodulation signal Sdm, and continuously outputs the stored demodulation signal Sdm when the stream switch 84 is closed. The track buffer 83 compensates a difference or fluctuation in the data amount between respective GOP under the MPEG 2 method, and continuously outputs the demodulation signal Sdm, which is discontinuously inputted due to a track jump in the aforementioned seamless reproduction, in case of reading the data divided into the interleaved units IU, so as to avoid the interruption of the reproduction due to the discontinuity.

The opening and closing operation of the stream switch 84, to which the demodulation signal Sdm is continuously inputted, is controlled by a switch signal Ssw2 from the system controller 100 such that the various buffers at its posterior stage may not be over-flown or, on the contrary, may not become empty to stop the decoding process, in the separating process by the demultiplexer 86.

On the other hand, the system buffer 85, to which the demodulation signal Sdm is inputted in parallel with the track buffer 83, accumulates the control information which is detected firstly upon loading the DVD 1 and which is related to the whole information recorded on the DVD 1 (e.g. the video manager 2 etc.), the control data 11 of the VTS 3 and the like (refer to FIG. 1). Then, the system buffer 85 outputs the accumulated data as one portion of a control information Sc to the system controller 100, and temporarily stores the DSI data 51 for each navi-pack 41 (refer to FIG. 1) while reproducing the information, to output it as another portion of the control information Sc.

The demultiplexer 86, to which the demodulation signal Sdm is continuously inputted through the stream switch 84, separates the video data 42, the audio data 43, the sub picture data 44 and the PCI data 50 for each navi-pack 41 respectively from the inputted demodulation signal Sdm, and outputs them as a video signal Sv, a sub picture signal Ssp, an audio signal Sad and a PCI signal Spc respectively to the VBV buffer 87, the sub picture buffer 89, the audio buffer 92 and the PCI buffer 94. There may be a case where, in the demodulation signal Sdm, different streams of the audio data 43 or the sub picture data 44 in a plurality of different languages are included as the audio or sub picture information. In that case, a desirable language is selected for the audio or sub picture information by a stream selection signal Slc from the system controller 100, so that the audio or sub picture information in the desirable language is outputted to the audio buffer 92 or the sub picture buffer 89.

At this time, the demultiplexer 86 extracts the pack header and the packet header from each pack (including the audio pack AP) and each packet (including the audio packet APT) respectively, and outputs the information included therein as a header signal Shd to the system controller 100. In the header signal Shd, the pack header 64, the packer header 65, the sub stream ID information, the audio frame information 67, the audio data information 68 etc. of the audio pack AP, which are separated by the demultiplexer 86, are included.

In the audio signal Sad, the audio data 43, which is divided into the audio packs AP as shown in FIG. 3A or 3B, is included. In each audio pack AP, a plurality of audio frames AF as shown in FIG. 3A, or a plurality of audio access units AAu as shown in FIG. 3B, are included.

The VBV buffer 87, to which the video signal Sv is inputted, consists of a FIFO memory, for example. The VBV buffer 87 temporarily stores the video signal Sv and outputs it to the video decoder 88. The VBV buffer 87 compensates the difference or fluctuation in the data amount between respective pictures of the video signal Sv compressed by the MPEG 2 method (refer to FIG. 2). Then, the video signal Sv in which the differences in the data amount are compensated, is outputted to the video decoder 88, and is decoded by the MPEG 2 method to be outputted as a decoded video signal Svd to the mixer 91.

On the other hand, the sub picture buffer 89, to which the sub picture signal Ssp is inputted, temporarily stores the inputted sub picture signal Ssp, and outputs it to the sub picture decoder 90. The sub picture buffer 89 is to synchronize the sub picture data 44 included in the sub picture signal Ssp with the video data 42 corresponding to the sub picture data 44, and to output it. Then, the sub picture signal Ssp synchronized with the video data 42 is inputted to the sub picture decoder 90 and is decoded to be outputted as a decoded sub picture signal Sspd to the mixer 91.

In a case where the sub picture signal Ssp includes video information to construct a frame, a selection button etc. for displaying the menu picture plane, the sub picture decoder 90 changes a display condition of the selection button etc. to be displayed, in the sub picture signal Sspd on the basis of a high light control information Sch from the system controller 100 to output it.

The decoded video signal Svd outputted from the video decoder 88 and the decoded sub picture signal Sspd outputted from the sub picture decoder 90 (which is in synchronization with the corresponding decoded video signal Svd) are mixed together by the mixer 91, and are outputted as a final video signal Svp to be displayed to a display device such as a CRT (Cathode Ray Tube) device not illustrated.

The audio buffer 92, to which the audio signal Sad is inputted, consists of a FIFO memory, for example. The audio buffer 92 temporarily stores the audio signal Sad and outputs it to the audio decoder 93. The audio buffer 92 is to synchronize the audio signal Sad with the video signal Sv or the sub picture signal Ssp including the corresponding video information, and delays the audio signal Sad in accordance with the output condition of the corresponding video information. Then, the audio signal Sad, which is time-adjusted to synchronize with the corresponding video information (in the signal form as shown in the lower stage of FIG. 7 or FIG.

8), is outputted to the audio decoder 93. Then, a predetermined decoding process i.e. the reproducing process based on the linear PCM method or the decoding process based on the Dolby AC 3 method, is applied thereto to the audio signal Sad, on the basis of the header control signal Shc outputted from the system controller 100, and it is outputted as a decoded audio signal Sadd to a speaker etc. not illustrated. The process by the audio decoder 93 will be explained later in detail.

In case that the aforementioned padding packet PP (refer to the upper stage of FIG. 7 or FIG. 8) is included in the audio pack AP separated by the demultiplexer 86, the padding packet PP is discarded (i.e. a skip of reading is performed) at the audio decoder 92, on the basis of the header control signal Shc based on the information in the packer header 65 which indicates the pertinent packet is the padding packet PP (which is inputted to the system controller 100 as the header signal Shd), so that it is avoided to output the padding packets PP from the audio buffer 92. Thus, only the audio stream shown in the lower stage of FIG. 7 or FIG. 8 is inputted to the audio decoder 93.

If it is detected by the system controller 100 that it is necessary to temporarily stop (pause) the audio voice in the reproduction immediately after accessing the desired information, a pause signal Sca is outputted from the system controller 100 to the audio decoder 93, so that the output of the decoded audio signal Sadd is stopped temporarily at the audio decoder 93.

The PCI buffer 94, to which the PCI signal Spc is inputted, consists of a FIFO memory, for example. The PCI buffer 94 temporarily stores the inputted PCI signal Spc and outputs it to the PCI decoder 95. The PCI buffer 94 is to synchronize the PCI data 50, which is included in the PCI signal Spc, with the video data 42, the audio data 43 and the sub picture data 44 corresponding to the PCI data 50, and apply the PCI data 50 to the video data 42, the audio data 43 and the sub picture data 44. Then, from the PCI signal Spc, which is synchronized with the corresponding the video data 42, the audio data 43 or the sub picture data 44 by the PCI buffer 94, high light information included in the PCI data 50 is separated or extracted by the PCI decoder 95, and is outputted as a high light signal Shi to the high light buffer 96. The portion of the PCI data 50 other than the high light information is outputted as a PCI information signal Spci to the system controller 100.

The high light buffer 96, to which the high light signal Shi is inputted, consists of a FIFO memory, for example. The high light buffer 96 temporarily stores the inputted high light signal Shi and outputs it to the high light decoder 97. The high light buffer 96 is to time-compensate the high light signal Shi so as to precisely perform a change in the display condition of the selection item, which corresponds to the high light information, in correspondence with the sub picture signal Ssp which includes the video information for the high light information. Then, the time-compensated high light signal Shi is decoded by the high light decoder 97, and the information included in the high light signal Shi is outputted as a decoded high light signal Shid to the system controller 100. The information to set the value of the register in the system controller 100 is included in this decoded high light signal Shid.

Here, the system controller 100 outputs the aforementioned high light control signal Sch to change the display condition by the high light information, on the basis of the decoded high light signal Shid. At this time, the system controller 100 receive the selecting operation by the input signal Sin from the input unit 98, so as to make effective or valid the selecting operation by use of the menu picture plane based on the high light information on the basis of the effective time interval information, which indicates the effective time interval of the high light information included in the decoded high light signal Shid, and outputs the aforementioned high light control signal Sch.

Further, on the basis of the control information Sc inputted from the system buffer 85, the header signal Shd inputted from the demultiplexer 86, the PCI information signal Spci inputted from the PCI decoder 95 and an input signal Sin inputted from the input unit 98 such as a remote controller, the system controller 100 outputs the aforementioned switch signal Ssw2, a stream selection signal (e.g. a language selection signal) Slc, the header control signal Shc, the pause signal Sca and the high light control signal Sch to correctly perform the reproduction corresponding to those input signals, and also outputs a display signal Sdp to display an operation condition etc. of the reproducing apparatus SS2 to the display unit 99 such as the liquid crystal device.

Furthermore, the system controller 100 outputs a seamless control signal Scs1 corresponding to the track jump process, to the drive controller 101, when it detects by the DSI information signal Sdsi (in the control signal Sc) etc. that it is necessary to perform the track jump process such as a search in order to perform the seamless reproduction.

Then, the drive controller 101, to which the seamless control signal Scs1 is inputted, outputs a drive signal Sd to the spindle motor 102 or the slider motor 103. By this drive signal Sd, the spindle motor 102 or the slider motor 103 moves the optical pickup 80 such that the record position to be reproduced on the DVD 1 is irradiated with the light beam B (refer to an arrow of a broken line in FIG. 12), and the spindle motor 102 CLV-controls (Constant Linear Velocity-controls) the rotation number of the DVD 1. Along with this, the drive controller 101 outputs the aforementioned switch signal Ssw1 on the basis of the seamless control signal Scs1, so as to open the stream switch 82 when the demodulation signal Sdm is not outputted from the demodulate and correct unit 81 while the optical pickup 80 is being moved, and so as to close the stream switch 82 when the demodulation signal Sdm is started to be outputted, so that the demodulation signal Sdm is outputted to the track buffer 83.

Figure 13A:
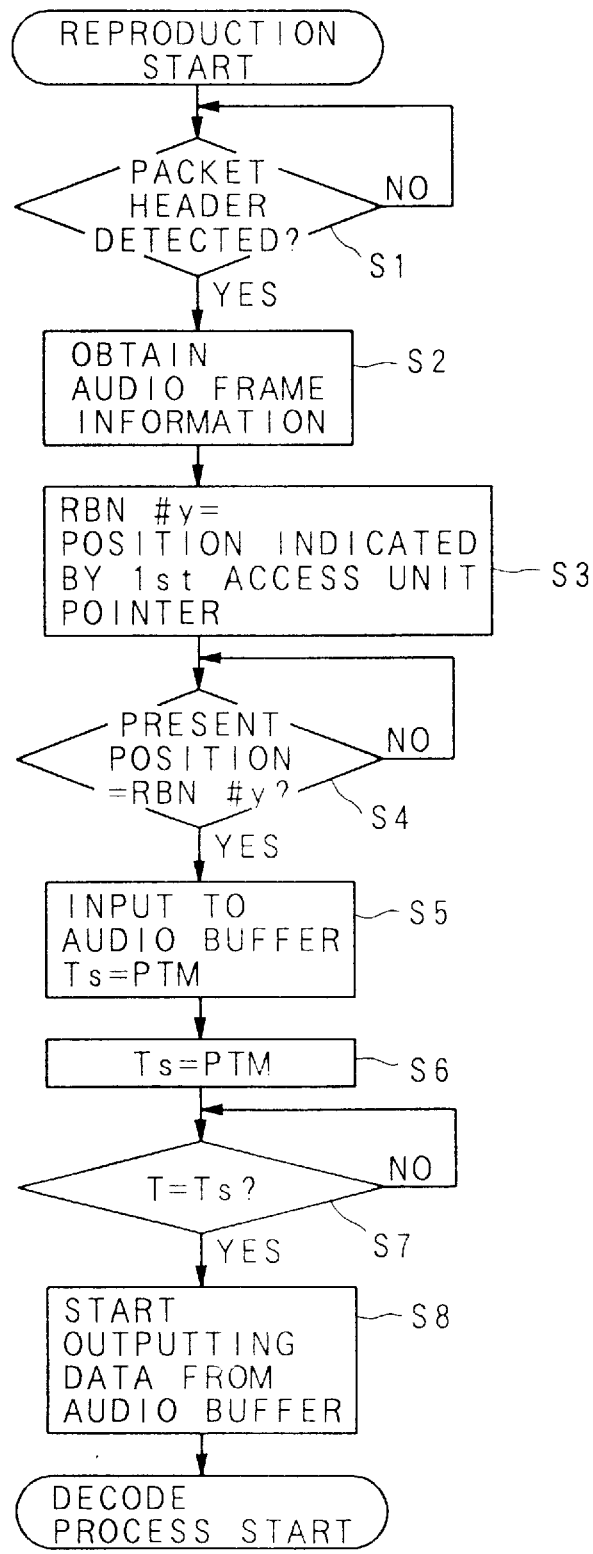
FIG. 13A is a flow chart showing a process for searching a start position of an audio frame or audio access unit in reproduction processes of audio data by use of a first access unit pointer.
Figure 13B:
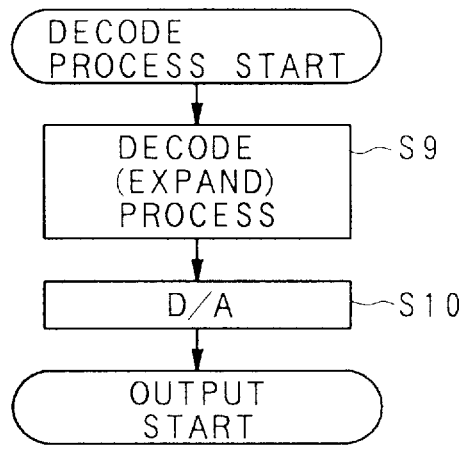
FIG. 13B is a flow chart showing a decoding process in the reproduction processes of the audio data by use of the first access unit pointer.

An operation of the decode process of the audio data 43 using the first access unit pointer 200 in accordance with the present invention is explained by using flow charts shown in FIGS. 13A and 13B. In the flow chart of FIG. 13A, operations indicated at steps S1 to S8 are operations performed mainly by the demultiplexer 86, the audio buffer 92 and the system controller 100. In the flow chart 13B, operations performed at steps S9 and S10 are operations performed mainly by the audio decoder 93.

In the reproduction process by means of the first access unit pointer 200 at the demultiplexer 86 etc., it is judged whether or not the demultiplexer 86 has recognized the audio pack AP by firstly detecting the packet header 65, which is included in the demodulation signal Sdm outputted continuously from the track buffer 83, by the demultiplexer 86 (Step S1). If the packet header 65 of the audio pack AP is not detected (Step S1; NO), the processes for other packs, such as the video pack and the like, are performed until it is detected. If it is detected (Step S1; YES), the audio frame information 67 included in the audio pack AP is separated by the demultiplexer 86 (Step S2). By referring to the first access unit pointer 200 included in the obtained audio frame information 67, a parameter RBN (Relative Byte Number) #y, which indicates the head position of the audio frame AF or the audio access unit AAu, is set to the number of bytes corresponding to the position indicated by the first access unit pointer 200 (Step S3). Along with this, the header signal Shd including the obtained audio frame information 67 is outputted from the demultiplexer 86 to the system controller 100.

Next, it is judged whether or not the number of bytes (i.e. the present position) of the data in the audio data 43 included in the demodulation signal Sdm outputted from the track buffer 83 becomes equal to the set value of the parameter RBN#y (Step S4). Then, if it does not becomes equal to the set value of the parameter RBN#y (Step S4; NO), the audio data 43 in the demodulation signal Sdm is discarded in the demultiplexer 86 until it becomes equal. This operation can prevent the unnecessary audio data 43, which starts from a midway of the audio frame AF or the audio access unit AAu (to which the decode process cannot be performed), from being outputted to the audio buffer 92. Thus, only the audio data 43 from the head or beginning portion of the audio frame AF or the audio access unit AAu is inputted to the audio decoder 93 at the posterior stage of the audio buffer 92.

On the other hand, in the judgment at the step S4, if the number of bytes (i.e. the current position) of the data in the audio data 43 becomes equal to the set value of the parameter RBN#y (Step S4; YES), the head or beginning portion of the audio data 43 at that time is assumed to be the head or beginning position of the audio frame AF or the audio access unit AAu, and then the audio signal Sad is started to be outputted from the demultiplexer 86 to the audio buffer 92 (Step S5).

At this time, the system controller 100 sets, on the basis of PTM (Presentation Time) information, which indicates a reproduction time of outputting the audio data 43 included in the audio pack AP for each audio pack AP and which is in the header signal Shd outputted by the demultiplexer 86, a parameter Ts indicative of a reproduction time to the reproduction time indicated by the PTM (Step S6). Then, it is judged whether or not a standard time T (which is set in the system controller 100) for controlling the operation in the reproducing apparatus SS2 becomes the reproduction time indicated by the parameter Ts (Step S7). Then it does not become the reproduction time (Step S7; NO), the operation is waited as it is. If it becomes the reproduction time (Step S7; YES), the audio signal Sad is read out from the audio buffer 92 by the header control signal Shc from the system controller 100 (Step S8), and is inputted to the audio decoder 93, where the decode process (i.e. the expanding process in case that the audio signal Sad is compressed by the Dolby AC3 method, or the re-synthesizing process of the high order bit data of 16 bits and the low order bit data of 8 bits in case that the audio signal Sad is recorded by the linear PCM method) is performed (Step S9). At this time, since the audio data 43 included in the audio signal Sad is the data from the beginning of the audio frame AF or the audio access unit AAu, the decode process can be started immediately.

Here, in the decode process at the step S9, since the data amount of the audio data 43 respectively included in one audio frame AF or audio access unit AAu is constant, after the start position of the first audio frame AF or audio access unit AAu included in the audio packet APT described by the first access unit pointer 200 is detected, it is possible to search the start position of the audio frames AF and audio access units AAu consecutively detected after decoding the first audio frame AF or audio access unit AAu. By this, each decode process or reproduction process is performed.

As for the audio access unit AAu, in case that the amount of the audio data 43 included therein is not constant, the data amount of the audio data 43 included in the audio access unit AAu is described in each header H. Thus, on the basis of it, the start position of the audio access unit AAu which is consecutively detected is searched, and by this, the decode process is performed.

After the process at the step S9 is ended, it is converted into an analog signal by a D/A (Digital/Analog) converter (not shown) (Step S10), and is outputted from a speaker and the like (not shown).

According to the above mentioned series of the operations, it is possible to use the first access unit pointer 200 to quickly search the head or beginning portion of the audio frame AF or the audio access unit AAu to thereby reproduce the audio data 43.

This effect is further explained here. Namely, without the first access unit pointer 200 in accordance with the present invention, it would be extremely difficult to search the head or beginning portion of the audio frame AF, in the linear PCM method. In this case, only the method of achieving a synchronization with the output of the video data 42 is to search the audio data 43 corresponding to a reproduction time coincident with the reproduction time of the video data 42 by searching the PTM within the audio data 43. Thus, until the audio data 43 corresponding to the reproduction time coincident with the reproduction time of the video data 42 is separated by the demultiplexer 86, the decode process of the audio data 43 cannot be performed. This may result in the interruption of the reproduction.

On the other hand, without the first access unit pointer 200 in accordance with the present invention, in case of the Dolby AC3 method, the expanding process of the audio data 43 cannot be performed until searching the head or beginning portion of the audio access unit AAu. Thus, in order to search the head portion of the audio access unit AAu, a complex process as shown in FIGS. 14A and 14B would be required in the audio decoder 93.

Figure 14A:
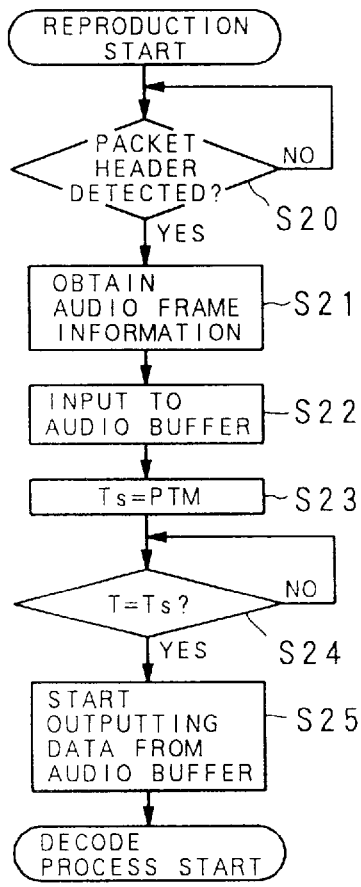
FIG. 14A is a flow chart showing a process required until outputting data from the audio buffer in decoding and reproduction processes without using the first access unit pointer.
Figure 14B:
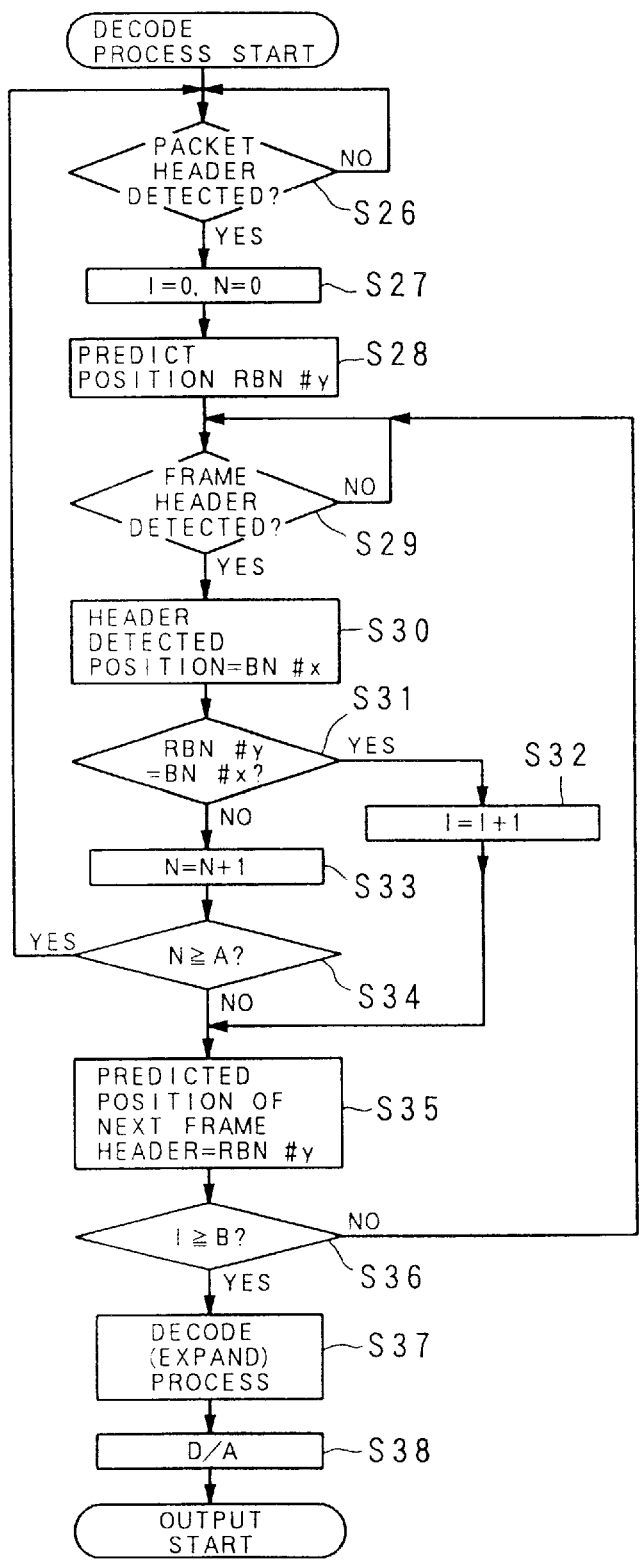
FIG. 14B is a flow chart showing a process of searching the starting position of the audio frame or audio access unit and decoding it in the decoding and reproduction processes without using the first access unit pointer.

In the flow charts shown in FIGS. 14A and 14B, operations indicated at steps S20 to S25 in FIG. 14A are operations performed mainly by the demultiplexer 86, the audio buffer 92 and the system controller 100. Operations performed at steps S26 to S37 in FIG. 14B are operations performed mainly by the audio decoder 93.

As shown in FIG. 14A, in the reproduction process without the first access unit pointer 200, it is judged whether or not the demultiplexer 86 has recognized the audio pack AP by firstly detecting the packet header 65, which is included in the demodulation signal Sdm outputted continuously from the track buffer 83, by the demultiplexer 86 (Step S20). If the packet header 65 of the audio pack AP is not detected (Step S20; NO), the processes of other packs, such as the video pack and the like, are performed until it is detected. If it is detected (Step S20; YES), the audio frame information 67 included in the audio pack AP is separated by the demultiplexer 86 (Step S21).

Next, the audio signal Sad is outputted from the demultiplexer 86 to the audio buffer 92, and the audio data 43 within the audio pack AP included in the audio signal Sad is inputted to the audio buffer 92 (Step S22).

At this time, the system controller 100 sets, on the basis of the PTM for each audio pack AP within the header signal Shd outputted by the demultiplexer 86, the parameter Ts indicative of the reproduction time to a reproduction time indicated by the PTM (Step S23). Then, it is judged whether or not the standard time T within the reproducing apparatus SS2 becomes the reproduction time indicated by the parameter Ts (Step S24). When it does not become the reproduction time (Step S24; NO), the operation is waited as it is. If it becomes the reproduction time (Step S24; YES), the audio signal Sad is read out from the audio buffer 92 on the basis of the header control signal Shc from the system controller 100 (Step S25), and is inputted to the audio decoder 93, where the decode process (the expanding process corresponding to the Dolby AC3 method) is performed. At this time, the audio data 43 is not always the data from the head or beginning portion of the audio frame AF or the audio access unit AAu. Thus, the audio decoder 93 cannot start the decode process immediately. Therefore, processes of searching the head or beginning portion of the audio access unit AAu indicated at the steps S26 to S36 in FIG. 14B, as explained below, are required in the audio decoder 93.

Namely, in the flow chart shown in FIG. 14B, in the audio decoder 93, it is firstly judged whether or not the packet header 65 at the head portion of the audio packet APT including the audio access unit AAu is detected (Step S26). If it is not detected (Step S26; NO), the operation is waited until it is detected. If it is detected (Step S26; YES), a parameter I, which indicates the number of correct headers H which have been searched, and a parameter N, which indicates the number of incorrect headers H which have been searched, are initialized (Step S27).

Next, a position of the next header H is predicted on the basis of a fact that the audio data amount included in each audio access unit AAu is constant, and this is defined as a parameter RBN#y (Step S28). Then, it is judged whether or not the next header H is detected (Step S29). If it is not detected (Step S29; NO), the operation is waited until it is detected. If it is detected (Step S29; YES), a position of the detected header H is defined as a parameter BN#x (Step S30). Next, it is judged whether or not the parameter RBN#y and the parameter BN#x are equal to each other (Step S31). If they are equal(Step S31; YES), the header H detected at the step S29 is judged as the correct H, and the parameter I is incremented by "1" (Step S32). Then, the flow proceeds to the operation at a step S35.

On the other hand, if the parameter RBN#Y and the parameter BN#x are not equal to each other (Step S31; NO), the header H detected at the step S29 is not judged as the correct header H, and the parameter N is incremented by "1" (Step S33). Then, it is judged whether or not the parameter N is not less than a predetermined value A (for example, "3"). If it is not less than the predetermined value A (Step S34; YES), it is judged that it is not possible to detect the correct header H. Then, the flow returns back to the step S26 so as to again perform the above mentioned processes from the beginning thereof.

If the parameter N is less than the predetermined value A in the judgment at the step S34 (Step S34; NO), it is judged that the header H detected at the step S29 is the correct header. Then, a position of the next header is predicted, and the predicted position is substituted for the parameter RBN#y (Step S35). Then, it is judged whether or not the parameter I becomes not less than a predetermined value B (for example, "3") (Step S36). If it becomes not less than the predetermined value B (Step S36; YES), the decode process is started from the position of the header H detected at the step S29. On the other hand, if the parameter I is less than the predetermined value B (Step S36; NO), the flow returns back to the step S29 so as to detect the next header H.

When the header H at the head or beginning portion of the audio access unit AAu is detected by the above mentioned processes at the steps S26 to S36, the expanding process for the audio access unit AAu is consecutively started, so that the decode process for the audio data 43 is performed (Steps S37 and S38).

As explained above, in a case that there is no first access unit pointer 200, the complex processes are required in either the linear PCM method or the Dolby AC3 method. Thus, a time necessary for the decode process or the reproduction process for the audio data 43 is prolonged, and the process burden on the audio decoder 93 is also made large. In contrast to this, the utilization of the first access unit pointer 200 in accordance with this embodiment enables the decode process or the reproduction process for the audio data 43 under the simple process as indicated in FIG. 13A or 13B, in either the linear PCM method or the Dolby AC3 method. Accordingly, the time necessary for the decode process or the reproduction process can be shortened, and the process burden on the audio decoder 93 can be made small. As a result, it is also easy to achieve the synchronization with the video data 42 and the like.

As mentioned above, according to the reproducing apparatus SS2 of this embodiment, the first access unit pointer 200, which indicates the start position of the audio frame AF or the audio access unit AAu within the audio packet APT, is recorded together with the audio data 43, on the DVD 1. Thus, it is possible to quickly search the start position of the audio frame AF or the audio access unit AAu on the basis of the first access unit pointer 200, and, on the basis of the searched start position, perform the reproduction process or the decode process of the record information for each audio frame AF or audio access unit AAu.

Especially, in a case that the audio data 43 is compressed by the Dolby AC3 method, it is possible to quickly search the head portion of the audio access unit AAu, and thereby perform the expanding process for each audio access unit AAu.

Further, in a case that the audio data 43 is quantized by the linear PCM method, it is possible to quickly search the head portion of the audio frame AF, and thereby perform the reproduction process for each audio frame AF.

In the above mentioned embodiment, the skip for reading the padding packet PP is performed in the audio buffer 92. However, the skip is not limited to this, but may be performed at a stage of the demultiplexer 86.

The embodiment of the information record medium is not limited to the above mentioned DVD 1.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An information recording apparatus, comprising:

a signal process means for applying a predetermined signal process to record information to be recorded onto an information record medium to thereby generate processed record information comprising a plurality of information units, which are set in advance;

a divide means for dividing said processed record information by each record unit, which includes one or more said information units and which is set in advance on the basis of said predetermined signal process;

a multiplex means for setting a start position of said one or more information units within said each record unit, on the basis of control information inputted from the external to control a reproduction of said record information, generating start position information indicating the start position and multiplexing said start position information with said processed record information for said each record unit, to thereby generate multiplexed processed record information; and a record means for recording said multiplexed processed record information onto said information record medium.

2. An information recording apparatus according to claim 1, wherein:

said signal process means applies a predetermined compression process as said predetermined signal process to said record information which comprises audio information;

said information unit is a compressed information unit in said predetermined compression process; and said start position information indicates the start position of a first information unit among said information units which start positions are included in said each record unit.

3. An information recording apparatus according to claim 1, wherein:

said signal process means applies a predetermined sampling process and a predetermined quantizing process as said predetermined signal process to said record information which comprises audio information;

said information unit comprises sampled values in a predetermined number, which are generated by said predetermined sampling process and said predetermined quantizing process; and said start position information indicates the start position of a first information unit among said information units which start positions are included in said each record unit.

4. An information record medium, on which record information to be reproduced by an information reproducing apparatus for controlling a reproduction of said record information on the basis of start position information recorded together with said record information on said information record medium is recorded, comprising a data structure stored in said information record medium and including:

processed record information, which is generated by applying a predetermined signal process to said record information, comprises a plurality of information units which are set in advance, and is divided by each record unit, which includes one or more said information units and is set in advance on the basis of said predetermined signal process; and said start position information indicating a start position of said one or more information units within said each record unit, said start position information and said processed record information being multiplexed with each other for said each record unit.

5. An information record medium according to claim 4, wherein:

said processed record information is generated by applying a predetermined compression process as said predetermined signal process to said record information which comprises audio information;

said information unit is a compressed information unit in said predetermined compression process; and said start position information indicates the start position of a first information unit among said information units which start positions are included in said each record unit.

6. An information record medium according to claim 4, wherein:

said processed record information is generated by applying a predetermined sampling process and a predetermined quantizing process as said predetermined signal process to said record information which comprises audio information;

said information unit comprises sampled values in a predetermined number, which are generated by, said predetermined sampling process and said predetermined quantizing process; and said start position information indicates the start position of a first information unit among said information units which start positions are included in said each record unit.

7. An information reproducing apparatus for reproducing record information from an information record medium, which comprises a data structure stored in said information record medium and including: processed record information, which is generated by applying a predetermined signal process to said record information, comprises a plurality of information units which are set in advance, and is divided by each record unit, which includes one or more said information units and is set in advance on the basis of said predetermined signal process; and start position information indicating a start position of said one or more information units within said each record unit, said start position information and said processed record information being multiplexed with each other for said each record unit and being recorded as multiplexed record information, said information reproducing apparatus comprising:

a detection and demodulation means for detecting and demodulating said multiplexed record information from said information record medium to thereby output a demodulation signal;

an extract means for extracting said start position information from said demodulation signal; and a reproduction process means for detecting the start position of said one or more information units on the basis of said extracted start position information to thereby perform a reproduction process of said record information for each of said information units.

8. An information reproducing apparatus according to claim 7, wherein:

said processed record information is generated by applying a predetermined compression process as said predetermined signal process to said record information which comprises audio information;

said information unit is a compressed information unit in said predetermined compression process; and said start position information indicates the start position of a first information unit among said information units which start positions are included in said each record unit.

9. An information reproducing apparatus according to claim 7, wherein:

said processed record information is generated by applying a predetermined sampling process and a predetermined quantizing process as said predetermined signal process to said record information which comprises audio information;

said information unit comprises sampled values in a predetermined number, which are generated by said predetermined sampling process and said predetermined quantizing process; and said start position information indicates the start position of a first information unit among said information units which start positions are included in said each record unit.

* * * * *